(12) United States Patent
Warren et al.

(10) Patent No.: US 8,523,083 B2
(45) Date of Patent: Sep. 3, 2013

(54) THERMOSTAT WITH SELF-CONFIGURING CONNECTIONS TO FACILITATE DO-IT-YOURSELF INSTALLATION

(75) Inventors: Daniel Adam Warren, SF, CA (US); Hugo Fiennes, Palo Alto, CA (US); Jonathan Alan Dutra, Saratoga, CA (US); David Bell, Los Altos Hills, CA (US); Anthony Michael Fadell, Portola Valley, CA (US); Matthew Lee Rogers, Los Gatos, CA (US)

(73) Assignee: Nest Labs, Inc., Palo Alto, CA (US)

( * ) Notice: Subject to any disclaimer, the term of this patent is extended or adjusted under 35 U.S.C. 154(b) by 0 days.

(21) Appl. No.: 13/531,486

(22) Filed: Jun. 22, 2012

(65) Prior Publication Data

US 2012/0273580 A1 Nov. 1, 2012

Related U.S. Application Data

(63) Continuation of application No. 13/467,029, filed on May 8, 2012, and a continuation-in-part of application No. PCT/US2011/061437, filed on Nov. 18, 2011, and a continuation-in-part of application No. 13/034,666, filed on Feb. 24, 2011, and a continuation-in-part of application No. 13/034,674, filed on Feb. 24, 2011, and a continuation-in-part of application No. 13/034,678, filed on Feb. 24, 2011.

(60) Provisional application No. 61/627,996, filed on Oct. 21, 2011.

(51) Int. Cl.
| | |
|---|---|
| *F24F 11/053* | (2006.01) |
| *G05D 23/00* | (2006.01) |
| *H01H 9/00* | (2006.01) |
| *H01H 35/00* | (2006.01) |
| *H01H 47/00* | (2006.01) |
| *H02J 1/08* | (2006.01) |
| *H02J 3/00* | (2006.01) |
| *H01B 11/02* | (2006.01) |
| *H01R 4/28* | (2006.01) |
| *H01R 11/22* | (2006.01) |

(52) U.S. Cl.
USPC ............ 236/1 C; 200/50.08; 200/50.09; 236/94; 307/12; 307/17; 307/116; 307/125; 307/147; 439/828; 439/829

(58) Field of Classification Search
USPC ....... 200/50.08, 50.09; 236/1 C, 94; 307/12, 307/17, 116, 125, 147; 439/828, 829
See application file for complete search history.

(56) References Cited

U.S. PATENT DOCUMENTS 4,157,506 A  6/1979 Spencer
(Continued)

FOREIGN PATENT DOCUMENTS

EP  207295 A1  6/1985
(Continued)

OTHER PUBLICATIONS

International Search Report and Written Opinion of PCT/US2012/030084 mailed on Jul. 6, 2012, 7 pages.
(Continued)

*Primary Examiner* — Frantz Jules
*Assistant Examiner* — Henry Crenshaw
(74) *Attorney, Agent, or Firm* — Kilpatrick Townsend & Stockton LLP

(57) ABSTRACT

A thermostat is configured for automated compatibility with HVAC systems that are either single-HVAC-transformer systems or dual-HVAC-transformer systems. The compatibility is automated in that a manual jumper installation is not required for adaptation to either single-HVAC-transformer systems or dual-HVAC-transformer systems. The thermostat has a plurality of HVAC wire connectors including a first call relay wire connector, a first power return wire connector, a second call relay wire connector, and a second power return wire connector. The thermostat is configured such that if the first and second external wires have been inserted into the first and second power return wire connectors, respectively, then the first and second power return wire connectors are electrically isolated from each other. Otherwise, the first and second power return wire connectors are electrically shorted together.

18 Claims, 16 Drawing Sheets

(56) References Cited

U.S. PATENT DOCUMENTS

| | | | |
|---|---|---|---|
| 4,308,991 A | 1/1982 | Peinetti et al. | |
| 4,528,459 A | 7/1985 | Wiegel | |
| 4,695,246 A | 9/1987 | Beilfuss et al. | |
| 4,842,510 A | 6/1989 | Grunden et al. | |
| 4,872,828 A | 10/1989 | Mierzwinski et al. | |
| 4,898,229 A * | 2/1990 | Brown et al. | 165/11.1 |
| 4,948,040 A | 8/1990 | Kobayashi et al. | |
| 4,948,044 A | 8/1990 | Cacciatore | |
| 4,955,806 A | 9/1990 | Grunden et al. | |
| 5,065,813 A | 11/1991 | Berkeley et al. | |
| 5,107,918 A | 4/1992 | McFarlane et al. | |
| 5,127,464 A * | 7/1992 | Butler et al. | 165/253 |
| 5,158,477 A | 10/1992 | Testa et al. | |
| 5,161,606 A | 11/1992 | Berkeley et al. | |
| 5,175,439 A | 12/1992 | Harer et al. | |
| 5,251,813 A * | 10/1993 | Kniepkamp | 236/46 R |
| 5,255,179 A | 10/1993 | Zekan et al. | |
| 5,347,982 A | 9/1994 | Binzer et al. | |
| 5,352,930 A * | 10/1994 | Ratz | 307/43 |
| 5,381,950 A | 1/1995 | Aldridge | |
| 5,422,808 A * | 6/1995 | Catanese et al. | 700/79 |
| 5,452,762 A | 9/1995 | Zillner | |
| 5,456,407 A | 10/1995 | Stalsberg et al. | |
| 5,460,327 A | 10/1995 | Hill et al. | |
| 5,462,225 A | 10/1995 | Massara et al. | |
| 5,467,921 A | 11/1995 | Shreeve et al. | |
| 5,506,569 A | 4/1996 | Rowlette | |
| 5,544,036 A | 8/1996 | Brown, Jr. et al. | |
| 5,570,837 A | 11/1996 | Brown et al. | |
| 5,595,342 A | 1/1997 | McNair et al. | |
| 5,611,484 A | 3/1997 | Uhrich | |
| 5,635,896 A | 6/1997 | Tinsley et al. | |
| 5,655,709 A | 8/1997 | Garnett et al. | |
| 5,697,552 A | 12/1997 | McHugh et al. | |
| 5,736,795 A | 4/1998 | Zuehlke et al. | |
| 5,903,139 A | 5/1999 | Kompelien | |
| 5,950,709 A | 9/1999 | Krueger et al. | |
| 5,957,374 A | 9/1999 | Bias et al. | |
| 6,060,719 A | 5/2000 | DiTucci et al. | |
| 6,084,518 A | 7/2000 | Jamieson | |
| 6,089,310 A * | 7/2000 | Toth et al. | 165/11.1 |
| 6,102,749 A | 8/2000 | Lynn et al. | |
| 6,213,404 B1 | 4/2001 | Dushane et al. | |
| 6,222,719 B1 | 4/2001 | Kadah | |
| 6,275,160 B1 | 8/2001 | Ha | |
| 6,315,211 B1 | 11/2001 | Sartain et al. | |
| 6,356,038 B2 | 3/2002 | Bishel | |
| 6,509,838 B1 | 1/2003 | Payne et al. | |
| 6,513,723 B1 | 2/2003 | Mueller et al. | |
| 6,566,768 B2 | 5/2003 | Zimmerman et al. | |
| 6,622,925 B2 | 9/2003 | Carner et al. | |
| 6,657,418 B2 | 12/2003 | Atherton | |
| 6,743,010 B2 | 6/2004 | Bridgeman et al. | |
| 6,794,771 B2 | 9/2004 | Orloff | |
| 6,798,341 B1 | 9/2004 | Eckel et al. | |
| 6,851,621 B1 | 2/2005 | Wacker et al. | |
| 6,886,754 B2 * | 5/2005 | Smith et al. | 236/10 |
| 6,956,463 B2 | 10/2005 | Crenella et al. | |
| 6,997,390 B2 | 2/2006 | Alles | |
| 7,055,759 B2 | 6/2006 | Wacker et al. | |
| 7,083,109 B2 | 8/2006 | Pouchak | |
| 7,156,318 B1 | 1/2007 | Rosen | |
| 7,167,079 B2 | 1/2007 | Smyth et al. | |
| 7,174,239 B2 | 2/2007 | Butler et al. | |
| 7,181,317 B2 | 2/2007 | Amundson et al. | |
| 7,360,370 B2 | 4/2008 | Shah et al. | |
| 7,476,988 B2 | 1/2009 | Mulhouse et al. | |
| 7,510,126 B2 | 3/2009 | Rossi et al. | |
| 7,537,171 B2 | 5/2009 | Mueller et al. | |
| 7,555,364 B2 | 6/2009 | Poth et al. | |
| 7,562,536 B2 | 7/2009 | Harrod et al. | |
| 7,571,865 B2 | 8/2009 | Nicodem et al. | |
| 7,634,504 B2 | 12/2009 | Amundson | |
| 7,648,077 B2 | 1/2010 | Rossi et al. | |
| 7,673,809 B2 * | 3/2010 | Juntunen | 236/78 R |
| 7,748,640 B2 | 7/2010 | Roher et al. | |
| 7,755,220 B2 | 7/2010 | Sorg et al. | |
| 7,775,452 B2 | 8/2010 | Shah et al. | |
| 7,841,542 B1 | 11/2010 | Rosen | |
| 7,844,764 B2 | 11/2010 | Williams | |
| 7,847,681 B2 | 12/2010 | Singhal et al. | |
| 7,900,849 B2 | 3/2011 | Barton et al. | |
| 8,067,912 B2 | 11/2011 | Mullin | |
| 2002/0074865 A1 | 6/2002 | Zimmerman et al. | |
| 2003/0064335 A1 | 4/2003 | Canon | |
| 2003/0231001 A1 | 12/2003 | Bruning | |
| 2004/0120084 A1 * | 6/2004 | Readio et al. | 361/38 |
| 2004/0130454 A1 | 7/2004 | Barton | |
| 2004/0193324 A1 | 9/2004 | Hoog et al. | |
| 2004/0209209 A1 | 10/2004 | Chodacki et al. | |
| 2004/0238651 A1 | 12/2004 | Juntunen et al. | |
| 2004/0245349 A1 | 12/2004 | Smith et al. | |
| 2005/0040250 A1 | 2/2005 | Wruck | |
| 2005/0159846 A1 | 7/2005 | Van Ostrand et al. | |
| 2005/0195757 A1 | 9/2005 | Kidder et al. | |
| 2005/0270151 A1 | 12/2005 | Winick | |
| 2006/0124759 A1 | 6/2006 | Rossi | |
| 2006/0186214 A1 | 8/2006 | Simon et al. | |
| 2007/0045432 A1 | 3/2007 | Juntunen | |
| 2007/0045441 A1 | 3/2007 | Ashworth et al. | |
| 2007/0131787 A1 | 6/2007 | Rossi et al. | |
| 2007/0208461 A1 | 9/2007 | Chase | |
| 2007/0221741 A1 | 9/2007 | Wagner et al. | |
| 2007/0228183 A1 | 10/2007 | Kennedy et al. | |
| 2007/0241203 A1 | 10/2007 | Wagner et al. | |
| 2008/0015742 A1 | 1/2008 | Kulyk et al. | |
| 2008/0054082 A1 | 3/2008 | Evans et al. | |
| 2008/0054084 A1 | 3/2008 | Olson | |
| 2008/0094010 A1 * | 4/2008 | Black | 315/307 |
| 2008/0128523 A1 | 6/2008 | Hoglund et al. | |
| 2008/0147242 A1 | 6/2008 | Roher | |
| 2008/0161977 A1 | 7/2008 | Takach et al. | |
| 2009/0057425 A1 | 3/2009 | Sullivan et al. | |
| 2009/0099697 A1 | 4/2009 | Li et al. | |
| 2009/0140056 A1 | 6/2009 | Leen | |
| 2009/0140057 A1 | 6/2009 | Leen | |
| 2009/0140064 A1 | 6/2009 | Schultz et al. | |
| 2009/0140065 A1 | 6/2009 | Juntunen et al. | |
| 2009/0143879 A1 | 6/2009 | Amundson et al. | |
| 2009/0143880 A1 | 6/2009 | Amundson et al. | |
| 2009/0195349 A1 | 8/2009 | Frader-Thompson et al. | |
| 2009/0236433 A1 | 9/2009 | Mueller et al. | |
| 2010/0006660 A1 | 1/2010 | Leen et al. | |
| 2010/0070099 A1 | 3/2010 | Watson et al. | |
| 2010/0084482 A1 | 4/2010 | Kennedy et al. | |
| 2010/0106305 A1 | 4/2010 | Pavlak et al. | |
| 2010/0106322 A1 | 4/2010 | Grohman | |
| 2010/0114382 A1 | 5/2010 | Ha et al. | |
| 2010/0131112 A1 | 5/2010 | Amundson et al. | |
| 2010/0163635 A1 | 7/2010 | Ye | |
| 2010/0182743 A1 | 7/2010 | Roher | |
| 2010/0193592 A1 | 8/2010 | Simon et al. | |
| 2010/0298985 A1 | 11/2010 | Hess et al. | |
| 2011/0025257 A1 | 2/2011 | Weng | |
| 2011/0253796 A1 | 10/2011 | Posa et al. | |
| 2012/0248211 A1 * | 10/2012 | Warren et al. | 236/1 |

FOREIGN PATENT DOCUMENTS

| | | |
|---|---|---|
| EP | 0 447 458 A1 | 9/1991 |
| EP | 447458 A1 | 9/1991 |
| EP | 0 510 807 A2 | 10/1992 |
| EP | 510807 A2 | 10/1992 |
| EP | 660287 A1 | 12/1994 |
| EP | 0 660 287 A1 | 6/1995 |
| EP | 0 690 363 A2 | 1/1996 |
| EP | 690363 A2 | 1/1996 |
| EP | 2 302 326 A1 | 3/2011 |
| EP | 2302326 A1 | 3/2011 |
| JP | 9-298780 | 11/1997 |
| SI | 20556 A | 10/2001 |
| WO | 2005/019740 A1 | 3/2005 |
| WO | 2007/027554 A2 | 3/2007 |
| WO | 2008/054938 A2 | 5/2008 |

OTHER PUBLICATIONS

Author Unknown, "Aprilaire Electronic Thermostats Model 8355 User's Manual," Research Products Corporation, 2000, 16 pages.
Author Unknown, "Braeburn 5300 Installer Guide," Braeburn Systems, LLC, 2009, 10 pages.
Author Unknown, "Braeburn Model 5200," Braeburn Systems, LLC, 2011, 11 pages.
Author Unknown, "Ecobee Smart Si Thermostat Installation Manual," Ecobee, 2012, 40 pages.
Author Unknown, "Ecobee Smart Si Thermostat User Manual," Ecobee, 2012, 44 pages.
Author Unknown, "Honeywell Installation Guide FocusPRO TH6000 Series," Honeywell International, Inc. 2012, 24 pages.
Author Unknown, "Hunter Internet Thermostat Installation Guide," Hunter Fan Co., 2012, 8 pages.
Author Unknown, "Installation and Start-Up Instructions Evolution Control," Bryant Heating & Cooling Systems, 2004, 12 pages.
Author Unknown, "Lennox ComfortSense 5000 Owners Guide," Lennox Industries, Inc., 2007, 32 pages.
Author Unknown, "Lennox ComfortSense 7000 Owners Guide," Lennox Industries, Inc., 2009, 15 pages.
Author Unknown, "Lux PSPU732T Manual," LUX Products Corporation, Date Unknown, 48 pages.
Author Unknown, "Lennox iComfort Manual," Lennox Industries, Inc., 2010, 20 pages.
Author Unknown, "RobertShaw Product Manual 9620," Maple Chase Company, 2001, 14 pages.
Author Unknown, "RobertShaw Product Manual 9825i2," Maple Chase Company, 2006, 36 pages.
Author Unknown, "SYSTXCCUIZ01-V Infinity Control Installation Instructions," Carrier Corp., 2012, 20 pages.
Author Unknown, "TB-PAC, TB-PHP, Base Series Programmable Thermostats," Carrier Corp., 2012, 8 pages.
Author Unknown, "Trane Communicating Thermostats for Fan Coil," Trane, 2011, 32 pages.
Author Unknown, "Trane Communicating Thermostats for Heat Pump Control," Trane, 2011, 32 pages.
Author Unknown, "Trane install XL600-Installation-Manual," Trane, 2006, 16 pages.
Author Unknown, "Trane XL950 Installation Guide," Trane, 2011, 20 pages.
Author Unknown, "Venstar T2900Manual," Venstar, Inc., 2008, 113 pages.
Author Unknown, "Venstar T5800Manual," Venstar, Inc., Unknown Date, 63 pages.
Author Unknown, "White Rodgers (Emerson) Model 1F81-261 Installation and Operating Instructions," White Rodgers, Unknown Date, 63 pages.
Author Unknown, "White Rodgers (Emerson) Model IF98EZ-1621 Homeowner's User Guide," White Rodgers, Unknown Date, 28 pages.
Author Unknown, "Honeywell Operating Manual FocusPRO TH6000 Series," Honeywell International, Inc. 2011, 80 pages.
Author Unknown, "Honeywell Prestige IAQ Product Data," Honeywell International, Inc. 2012, 126 pages.
Author Unknown, "VisionPRO TH8000 Series Installation Guide," Honeywell International, Inc. 2012, 12 pages
Author Unknown, "VisionPRO TH8000 Series Operating Manual," Honeywell International, Inc. 2012, 96 pages
Author Unknown, "VisionPRO Wi-Fi Programmable Thermostat," Honeywell International, Inc. 2012, 48 pages.
Author Unknown, "Honeywell Prestige THX9321-9421 Operating Manual," Honeywell International, Inc. 2011, 120 pages.

* cited by examiner

THERMOSTAT WITH SELF-CONFIGURING CONNECTIONS TO FACILITATE DO-IT-YOURSELF INSTALLATION

CROSS-REFERENCES TO RELATED APPLICATIONS

This application is a continuation of U.S. Ser. No. 13/467,029, filed May 8, 2012, which claims the benefit of U.S. Provisional Application No. 61/627,996 filed Oct. 21, 2011, entitled "User-Friendly, Network Connected Learning Thermostat And Related Systems And Methods."

U.S. Ser. No. 13/467,029 is also a continuation-in-part of the following commonly-assigned applications: PCT Application No. PCT/US11/61437 filed Nov. 18, 2011; U.S. Ser. No. 13/034,666 filed Feb. 24, 2011; U.S. Ser. No. 13/034,674 filed Feb. 24, 2011; and U.S. Ser. No. 13/034,678 filed Feb. 24, 2011.

Each of the above-referenced patent applications is incorporated herein by reference in its entirety for all purposes.

TECHNICAL FIELD

This patent specification relates to systems and methods for the monitoring and control of energy-consuming systems or other resource-consuming systems. More particularly, this patent specification relates control units that govern the operation of energy-consuming systems, household devices, or other resource-consuming systems, including automated compatibility of a thermostat with HVAC systems that are either single-HVAC-transformer systems or dual-HVAC-transformer systems.

BACKGROUND OF THE INVENTION

Substantial effort and attention continues toward the development of newer and more sustainable energy supplies. The conservation of energy by increased energy efficiency remains crucial to the world's energy future. According to an October 2010 report from the U.S. Department of Energy, heating and cooling account for 56% of the energy use in a typical U.S. home, making it the largest energy expense for most homes. Along with improvements in the physical plant associated with home heating and cooling (e.g., improved insulation, higher efficiency furnaces), substantial increases in energy efficiency can be achieved by better control and regulation of home heating and cooling equipment.

As is known, for example as discussed in the technical publication No. 50-8433, entitled "Power Stealing Thermostats" from Honeywell (1997), early thermostats used a bimetallic strip to sense temperature and respond to temperature changes in the room. The movement of the bimetallic strip was used to directly open and close an electrical circuit. Power was delivered to an electromechanical actuator, usually relay or contactor in the HVAC equipment whenever the contact was closed to provide heating and/or cooling to the controlled space. Since these thermostats did not require electrical power to operate, the wiring connections were very simple. Only one wire connected to the transformer and another wire connected to the load. Typically, a 24 VAC power supply transformer, the thermostat, and 24 VAC HVAC equipment relay were all connected in a loop with each device having only two external connections required.

When electronics began to be used in thermostats the fact that the thermostat was not directly wired to both sides of the transformer for its power source created a problem. This meant either the thermostat had to have its own independent power source, such as a battery, or be hardwired directly from the system transformer. Direct hardwiring a "common" wire from the transformer to the electronic thermostat may be very difficult and costly. However, there are also disadvantages to using a battery for providing the operating power. One primary disadvantage is the need to continually check and replace the battery. If the battery is not properly replaced and cannot provide adequate power, the electronic thermostat may fail during a period of extreme environmental conditions.

Because many households do not have a direct wire from the system transformer (such as a "common" wire), some thermostats have been designed to derive power from the transformer through the equipment load. The methods for powering an electronic thermostat from the transformer with a single direct wire connection to the transformer are called "power stealing" or "power sharing." The thermostat "steals," "shares" or "harvests" its power during the "OFF" periods of the heating or cooling system by allowing a small amount of current to flow through it into the load coil below its response threshold (even at maximum transformer output voltage). During the "ON" periods of the heating or cooling system the thermostat draws power by allowing a small voltage drop across itself. Ideally, the voltage drop will not cause the load coil to dropout below its response threshold (even at minimum transformer output voltage). Examples of thermostats with power stealing capability include the Honeywell T8600, Honeywell T8400C, and the Emerson Model 1F97-0671. However, these systems do not have power storage means and therefore must always rely on power stealing or must use disposable batteries.

Additionally, microprocessor controlled "intelligent" thermostats may have more advanced environmental control capabilities that can save energy while also keeping occupants comfortable. To do this, these thermostats require more information from the occupants as well as the environments where the thermostats are located. These thermostats may also be capable of connection to computer networks, including both local area networks (or other "private" networks) and wide area networks such as the Internet (or other "public" networks), in order to obtain current and forecasted outside weather data, cooperate in so-called demand-response programs (e.g., automatic conformance with power alerts that may be issued by utility companies during periods of extreme weather), enable users to have remote access and/or control thereof through their network-connected device (e.g., smartphone, tablet computer, PC-based web browser), and other advanced functionalities that may require network connectivity.

Issues arise in relation to providing microprocessor-controlled, network-connected thermostats, one or more such issues being at least partially resolved by one or more of the embodiments described hereinbelow. On the one hand, it is desirable to provide a thermostat having advanced functionalities such as those associated with relatively powerful microprocessors and reliable wireless communications chips, while also providing a thermostat that has an attractive, visually pleasing electronic display that users will find appealing to behold and interact with. On the other hand, it is desirable to provide a thermostat that is compatible and adaptable for installation in a wide variety of homes, including a substantial percentage of homes that are not equipped with the "common" wire discussed above. It is still further desirable to provide such a thermostat that accommodates easy do-it-yourself installation such that the expense and inconvenience of arranging for an HVAC technician to visit the premises to install the thermostat can be avoided for a large number of users. It is still further desirable to provide a thermostat having such processing power, wireless communications capabilities, visually pleasing display qualities, and other advanced functionalities, while also being a thermostat that, in addition to not requiring a "common" wire, likewise does not require to be plugged into household line current or a so-called "power brick," which can be inconvenient for the particular location of the thermostat as well as unsightly.

BRIEF SUMMARY OF THE INVENTION

This patent specification relates to systems and methods for the monitoring and control of energy-consuming systems or other resource-consuming systems. More particularly, this patent specification relates control units that govern the operation of energy-consuming systems, household devices, or other resource-consuming systems, including methods for providing electrical power for thermostats that govern the operation of heating, ventilation, and air conditioning (HVAC) systems. In a preferred embodiment, the thermostat is configured for automated compatibility with HVAC systems that are either single-HVAC-transformer systems or dual-HVAC-transformer systems. The compatibility is automated in that the thermostat is adapted to either single-HVAC-transformer systems or dual-HVAC-transformer systems without requiring a manual jumper installation and, in some cases, without requiring a processing function from a digital processor.

According to some embodiments of the present invention, a thermostat is configured for automated compatibility with HVAC systems that are either single-HVAC-transformer systems or dual-HVAC-transformer systems. The compatibility is automated in that a manual jumper installation is not required for adaptation to either single-HVAC-transformer systems or dual-HVAC-transformer systems. The thermostat includes a housing, one or more temperature sensors positioned within the housing for measuring ambient temperature, and a plurality of HVAC wire connectors configured for receiving a corresponding plurality of HVAC control wires. The HVAC wire connectors include a first call relay wire connector, a first power return wire connector, a second call relay wire connector, and a second power return wire connector. The thermostat also has a thermostatic control circuit coupled to the one or more temperature sensors and configured to at least partially control the operation of the HVAC system responsive to a sensed temperature. The thermostatic control circuit includes a first switching device that operatively connects the first call relay wire connector to the first power return wire connector to actuate a first HVAC function. The thermostat also includes a second switching device that operatively connects the second call relay wire connector to the second power return wire connector to actuate a second HVAC function. The thermostat also has an insertion sensing and connecting circuit coupled to said first and second power return wire connectors and configured such that:
(i) if first and second external wires have been inserted into the first and second power return wire connectors, respectively, then the first and second power return wire connectors are electrically isolated from each other; and
(ii) otherwise, the first and second power return wire connectors are electrically shorted together.

In some embodiments of the above thermostat, the insertion sensing and connecting circuit is configured to cause said electrical isolation of said first and second power return wire connectors upon a completion of an insertion of both of said first and second external wires without requiring a processing function from a digital processor. In an embodiment, the insertion sensing and connecting circuit is configured to open a pre-existing electrical connection between said first and second power return wire connectors by operation of first and second mechanically actuated switches coupled respectively to said first and second power return wire connectors, each said mechanically actuated switch being actuated by a physical wire insertion into the associated power return wire connector.

In some embodiments of the above thermostat, the thermostat also has a common connector and a second sensing circuitry that detects the presence of a common wire in the common connector, and causes a connection of the common connector to a power extraction circuit if the common wire is inserted, wherein the thermostat extracts power from the common wire if the common wire is inserted. In some embodiments, the second sensing circuitry is configured to detect the presence of a call relay wire in a corresponding call relay wire connector, and cause a connection of that connector to the power extraction circuit if (a) the common wire is not inserted, and (b) that call relay wire is inserted. In an embodiment, the second sensing circuitry is configured to detect the presence of a first call relay wire in the first call relay connector, and cause a connection of the first call relay wire to the power extraction circuit if (a) the common wire is not inserted, and (b) the first call relay wire is inserted. In another embodiment, the second sensing circuitry is configured to detect the presence of a second call relay wire in the second call relay connector, and cause a connection of the second call relay wire to the power extraction circuit if (a) the common wire is not inserted, and (b) the first call relay wire is not inserted. In some embodiment, the first call relay wire can refer to a cooling call relay wire, or the "Y" wire, and the second call relay wire can refer to a heating call relay wire, or the "W" wire.

According to an alternative embodiment, a method is provided for automating compatibility of a thermostat with HVAC systems that are either single-HVAC-transformer systems or dual-HVAC-transformer systems. The compatibility is automated in that a manual jumper installation is not required for adaptation to either single-HVAC-transformer systems or dual-HVAC-transformer systems. The thermostat includes a plurality of HVAC wire connectors configured for receiving a corresponding plurality of HVAC control wires, wherein the HVAC wire connectors include a first call relay wire connector, a first power return wire connector, a second call relay wire connector, and a second power return wire connector. The method includes operatively connecting the first call relay wire connector to the first power return wire connector to actuate a first HVAC function, and operatively connects the second call relay wire connector to the second power return wire connector to actuate a second HVAC function. The method also includes electrically isolating the first and second power return wire connectors, if first and second external wires have been inserted into the first and second power return wire connectors, respectively. The method also includes electrically shorting together the first and second power return wire connectors otherwise.

According to another embodiment of the present invention, a thermostat is configured for automated compatibility with HVAC systems that are either single-HVAC-transformer systems or dual-HVAC-transformer systems. The compatibility is automated in that the thermostat is adapted to either single-HVAC-transformer systems or dual-HVAC-transformer systems without requiring a manual jumper installation and without requiring a processing function from a digital processor.

A further understanding of the nature and advantages of the present invention may be realized by reference to the remaining portions of the specification and the drawings.

DETAILED DESCRIPTION OF THE INVENTION

Figure 1:
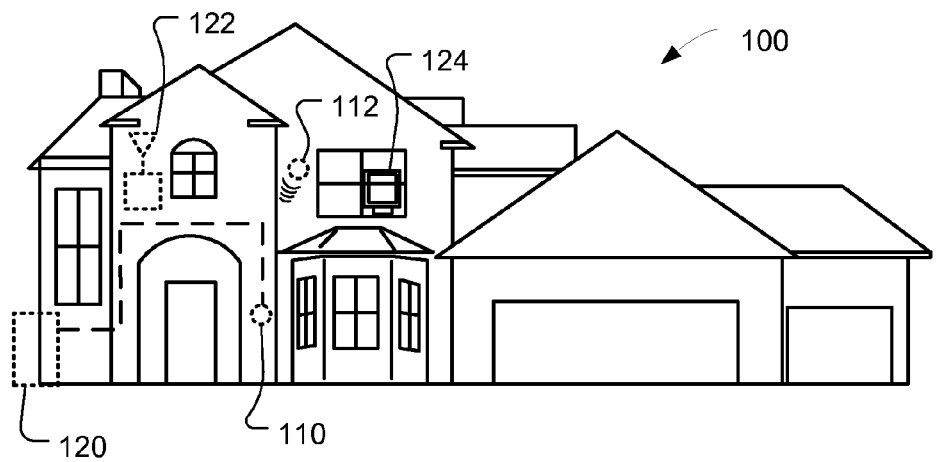
FIG. 1 illustrates an enclosure with an HVAC system according to some embodiments.

The subject matter of this patent specification relates to the subject matter of the following commonly assigned applications, each of which is incorporated by reference herein: U.S. Ser. No. 12/881,430 filed Sep. 14, 2010; U.S. Ser. No. 12/881,463 filed Sep. 14, 2010; U.S. Prov. Ser. No. 61/415,771 filed Nov. 19, 2010; U.S. Prov. Ser. No. 61/429,093 filed Dec. 31, 2010; U.S. Ser. No. 12/984,602 filed Jan. 4, 2011; U.S. Ser. No. 12/987,257 filed Jan. 10, 2011; U.S. Ser. No. 13/033,573 filed Feb. 23, 2011; U.S. Ser. No. 29/386,021, filed Feb. 23, 2011; U.S. Ser. No. 13/034,666 filed Feb. 24, 2011; U.S. Ser. No. 13/034,674 filed Feb. 24, 2011; U.S. Ser. No. 13/034,678 filed Feb. 24, 2011; U.S. Ser. No. 13/038,191 filed Mar. 1, 2011; U.S. Ser. No. 13/038,206 filed Mar. 1, 2011; U.S. Ser. No. 29/399,609 filed Aug. 16, 2011; U.S. Ser. No. 29/399,614 filed Aug. 16, 2011; U.S. Ser. No. 29/399,617 filed Aug. 16, 2011; U.S. Ser. No. 29/399,618 filed Aug. 16, 2011; U.S. Ser. No. 29/399,621 filed Aug. 16, 2011; U.S. Ser. No. 29/399,623 filed Aug. 16, 2011; U.S. Ser. No. 29/399,625 filed Aug. 16, 2011; U.S. Ser. No. 29/399,627 filed Aug. 16, 2011; U.S. Ser. No. 29/399,630 filed Aug. 16, 2011; U.S. Ser. No. 29/399,632 filed Aug. 16, 2011; U.S. Ser. No. 29/399,633 filed Aug. 16, 2011; U.S. Ser. No. 29/399,636 filed Aug. 16, 2011; U.S. Ser. No. 29/399,637 filed Aug. 16, 2011; U.S. Ser. No. 13/199,108, filed Aug. 17, 2011; U.S. Ser. No. 13/267,871 filed Oct. 6, 2011; U.S. Ser. No. 13/267,877 filed Oct. 6, 2011; U.S. Ser. No. 13/269,501, filed Oct. 7, 2011; U.S. Ser. No. 29/404,096 filed Oct. 14, 2011; U.S. Ser. No. 29/404,097 filed Oct. 14, 2011; U.S. Ser. No. 29/404,098 filed Oct. 14, 2011; U.S. Ser. No. 29/404,099 filed Oct. 14, 2011; U.S. Ser. No. 29/404,101 filed Oct. 14, 2011; U.S. Ser. No. 29/404,103 filed Oct. 14, 2011; U.S. Ser. No. 29/404,104 filed Oct. 14, 2011; U.S. Ser. No. 29/404,105 filed Oct. 14, 2011; U.S. Ser. No. 13/275,307 filed Oct. 17, 2011; U.S. Ser. No. 13/275,311 filed Oct. 17, 2011; U.S. Ser. No. 13/317,423 filed Oct. 17, 2011; U.S. Ser. No. 13/279,151 filed Oct. 21, 2011; U.S. Ser. No. 13/317,557 filed Oct. 21, 2011; U.S. Prov. Ser. No. 61/627,996 filed Oct. 21, 2011; PCT/US11/61339 filed Nov. 18, 2011; PCT/US11/61344 filed Nov. 18, 2011; PCT/US11/61365 filed Nov. 18, 2011; PCT/US11/61379 filed Nov. 18, 2011; PCT/US11/61391 filed Nov. 18, 2011; PCT/US11/61479 filed Nov. 18, 2011; PCT/US11/61457 filed Nov. 18, 2011; PCT/US11/61470 filed Nov. 18, 2011; PCT/US11/61339 filed Nov. 18, 2011; PCT/US11/61491 filed Nov. 18, 2011; PCT/US11/61437 filed Nov. 18, 2011; PCT/US11/61503 filed Nov. 18, 2011; U.S. Ser. No. 13/342,156 filed Jan. 2, 2012; PCT/US12/00008 filed Jan. 3 2012; PCT/US12/20088 filed Jan. 3, 2012; PCT/US12/20026 filed Jan. 3, 2012; PCT/US12/00007 filed Jan. 3, 2012; U.S. Ser. No. 13/351,688 filed Jan. 17, 2012; U.S. Ser. No. 13/356,762 filed Jan. 24, 2012; PCT/US12/30084 filed Mar. 22, 2012; U.S. Ser. No. 13/434,573 filed Mar. 29, 2012; U.S. Ser. No. 13/434,560 filed Mar. 29, 2012; U.S. Ser. No. 13/440,907 filed Apr. 5, 2012; and U.S. Ser. No. 13/440,910 filed Apr. 5, 2012. The above-referenced patent applications are collectively referenced herein as "the commonly assigned incorporated applications."

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

It is to be appreciated that while one or more embodiments are described further herein in the context of typical HVAC system used in a residential home, such as single-family residential home, the scope of the present teachings is not so limited. More generally, thermostats according to one or more of the preferred embodiments are applicable for a wide variety of enclosures having one or more HVAC systems including, without limitation, duplexes, townhomes, multi-unit apartment buildings, hotels, retail stores, office buildings and industrial buildings. Further, it is to be appreciated that while the terms user, customer, installer, homeowner, occupant, guest, tenant, landlord, repair person, and the like may be used to refer to the person or persons who are interacting with the thermostat or other device or user interface in the context of one or more scenarios described herein, these references are by no means to be considered as limiting the scope of the present teachings with respect to the person or persons who are performing such actions.

FIG. 1 is a diagram illustrating an exemplary enclosure using a thermostat 110 implemented in accordance with some embodiments of the present invention for controlling one or more environmental conditions. For example, enclosure 100 illustrates a single-family dwelling type of enclosure using a learning thermostat 110 (also referred to for convenience as "thermostat 110") for the control of heating and cooling provided by an HVAC system 120. Alternate embodiments of the present invention may be used with other types of enclosures including a duplex, an apartment within an apartment building, a light commercial structure such as an office or retail store, or a structure or enclosure that is a combination of these and other types of enclosures.

Some embodiments of thermostat 110 in FIG. 1 incorporate one or more sensors to gather data from the environment associated with enclosure 100. Sensors incorporated in thermostat 110 may detect occupancy, temperature, light and other environmental conditions and influence the control and operation of HVAC system 120. Sensors incorporated within thermostat 110 do not protrude from the surface of the thermostat 110 thereby providing a sleek and elegant design that does not draw attention from the occupants in a house or other enclosure. As a result, thermostat 110 and readily fits with almost any decor while adding to the overall appeal of the interior design.

As used herein, a "learning" thermostat refers to a thermostat, or one of plural communicating thermostats in a multi-thermostat network, having an ability to automatically establish and/or modify at least one future setpoint in a heating and/or cooling schedule based on at least one automatically sensed event and/or at least one past or current user input.

As used herein, a "primary" thermostat refers to a thermostat that is electrically connected to actuate all or part of an HVAC system, such as by virtue of electrical connection to HVAC control wires (e.g. W, G, Y, etc.) leading to the HVAC system.

As used herein, an "auxiliary" thermostat refers to a thermostat that is not electrically connected to actuate an HVAC system, but that otherwise contains at least one sensor and influences or facilitates primary thermostat control of an HVAC system by virtue of data communications with the primary thermostat.

In one particularly useful scenario, the thermostat 110 is a primary learning thermostat and is wall-mounted and connected to all of the HVAC control wires, while the remote thermostat 112 is an auxiliary learning thermostat positioned on a nightstand or dresser, the auxiliary learning thermostat being similar in appearance and user-interface features as the primary learning thermostat, the auxiliary learning thermostat further having similar sensing capabilities (e.g., temperature, humidity, motion, ambient light, proximity) as the primary learning thermostat, but the auxiliary learning thermostat not being connected to any of the HVAC wires. Although it is not connected to any HVAC wires, the auxiliary learning thermostat wirelessly communicates with and cooperates with the primary learning thermostat for improved control of the HVAC system, such as by providing additional temperature data at its respective location in the enclosure, providing additional occupancy information, providing an additional user interface for the user, and so forth.

It is to be appreciated that while certain embodiments are particularly advantageous where the thermostat 110 is a primary learning thermostat and the remote thermostat 112 is an auxiliary learning thermostat, the scope of the present teachings is not so limited. Thus, for example, while certain initial provisioning methods that automatically pair associates a network-connected thermostat with an online user account are particularly advantageous where the thermostat is a primary learning thermostat, the methods are more generally applicable to scenarios involving primary non-learning thermostats, auxiliary learning thermostats, auxiliary non-learning thermostats, or other types of network-connected thermostats and/or network-connected sensors. By way of further example, while certain graphical user interfaces for remote control of a thermostat may be particularly advantageous where the thermostat is a primary learning thermostat, the methods are more generally applicable to scenarios involving primary non-learning thermostats, auxiliary learning thermostats, auxiliary non-learning thermostats, or other types of network-connected thermostats and/or network-connected sensors. By way of even further example, while certain methods for cooperative, battery-conserving information polling of a thermostat by a remote cloud-based management server may be particularly advantageous where the thermostat is a primary learning thermostat, the methods are more generally applicable to scenarios involving primary non-learning thermostats, auxiliary learning thermostats, auxiliary non-learning thermostats, or other types of network-connected thermostats and/or network-connected sensors.

Enclosure 100 further includes a private network accessible both wirelessly and through wired connections and may also be referred to as a Local Area Network or LAN. Network devices on the private network include a computer 124, thermostat 110 and remote thermostat 112 in accordance with some embodiments of the present invention. In one embodiment, the private network is implemented using an integrated router 122 that provides routing, wireless access point functionality, firewall and multiple wired connection ports for connecting to various wired network devices, such as computer 124. Each device is assigned a private network address from the integrated router 122 either dynamically through a service like Dynamic Host Configuration Protocol (DHCP) or statically through actions of a network administrator. These private network addresses may be used to allow the devices to communicate with each directly over the LAN. Other embodiments may instead use multiple discrete switches, routers and other devices (not shown) to perform more other networking functions in addition to functions as provided by integrated router 122.

Integrated router 122 further provides network devices access to a public network, such as the Internet, provided enclosure 100 has a connection to the public network generally through a cable-modem, DSL modem and an Internet service provider or provider of other public network service. Public networks like the Internet are sometimes referred to as a Wide-Area Network or WAN. In the case of the Internet, a public address is assigned to a specific device allowing the device to be addressed directly by other devices on the Internet. Because these public addresses on the Internet are in limited supply, devices and computers on the private network often use a router device, like integrated router 122, to share a single public address through entries in Network Address Translation (NAT) table. The router makes an entry in the NAT table for each communication channel opened between a device on the private network and a device, server, or service on the Internet. A packet sent from a device on the private network initially has a "source" address containing the private network address of the sending device and a "destination" address corresponding to the public network address of the server or service on the Internet. As packets pass from within the private network through the router, the router replaces the "source" address with the public network address of the router and a "source port" that references the entry in the NAT table. The server on the Internet receiving the packet uses the "source" address and "source port" to send packets back to the router on the private network, which in turn forwards the packets to the proper device on the private network doing a corresponding lookup on an entry in the NAT table.

Entries in the NAT table allow both the computer device 124 and the thermostat 110 to establish individual communication channels with a thermostat management system (not shown) located on a public network such as the Internet. In accordance with some embodiments, a thermostat management account on the thermostat management system enables a computer device 124 in enclosure 100 to remotely access thermostat 110. The thermostat management system passes information from the computer device 124 over the Internet and back to thermostat 110 provided the thermostat management account is associated with or paired with thermostat 110. Accordingly, data collected by thermostat 110 also passes from the private network associated with enclosure 100 through integrated router 122 and to the thermostat management system over the public network. Other computer devices not in enclosure 100 such as Smartphones, laptops and tablet computers (not shown in FIG. 1) may also control thermostat 110 provided they have access to the public network where the thermostat management system and thermostat management account may be accessed. Further details on accessing the public network, such as the Internet, and remotely accessing a thermostat like thermostat 110 in accordance with embodiments of the present invention is described in further detail later herein.

In some embodiments, thermostat 110 may wirelessly communicate with remote thermostat 112 over the private network or through an ad hoc network formed directly with remote thermostat 112. During communication with remote thermostat 112, thermostat 110 may gather information remotely from the user and from the environment detectable by the remote thermostat 112. For example, remote thermostat 112 may wirelessly communicate with the thermostat 110 providing user input from the remote location of remote thermostat 112 or may be used to display information to a user, or both. Like thermostat 110, embodiments of remote thermostat 112 may also include sensors to gather data related to occupancy, temperature, light and other environmental conditions. In an alternate embodiment, remote thermostat 112 may also be located outside of the enclosure 100.

Figure 2:
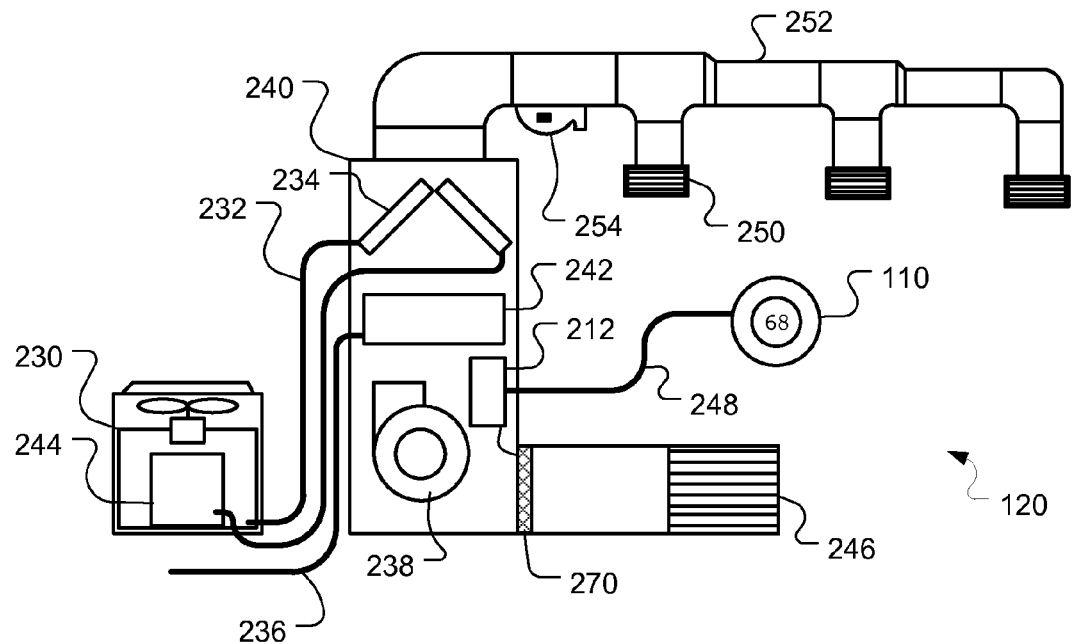
FIG. 2 is a diagram illustrating an HVAC system according to some embodiments.

FIG. 2 is a schematic diagram of an HVAC system controlled using a thermostat designed in accordance with embodiments of the present invention. HVAC system 120 provides heating, cooling, ventilation, and/or air handling for an enclosure 100, such as a single-family home depicted in FIG. 1. System 120 depicts a forced air type heating and cooling system, although according to other embodiments, other types of HVAC systems could be used such as radiant heat based systems, heat-pump based systems, and others.

In heating, heating coils or elements 242 within air handler 240 provide a source of heat using electricity or gas via line 236. Cool air is drawn from the enclosure via return air duct 246 through filter 270, using fan 238 and is heated through heating coils or elements 242. The heated air flows back into the enclosure at one or more locations via supply air duct system 252 and supply air registers such as register 250. In cooling, an outside compressor 230 passes a gas such as Freon through a set of heat exchanger coils 244 to cool the gas. The gas then goes through line 232 to the cooling coils 234 in the air handler 240 where it expands, cools and cools the air being circulated via fan 238. A humidifier 254 may optionally be included in various embodiments that returns moisture to the air before it passes through duct system 252. Although not shown in FIG. 2, alternate embodiments of HVAC system 120 may have other functionality such as venting air to and from the outside, one or more dampers to control airflow within the duct system 252 and an emergency heating unit. Overall operation of HVAC system 120 is selectively actuated by control electronics 212 communicating with thermostat 110 over control wires 248.

Figure 3A:
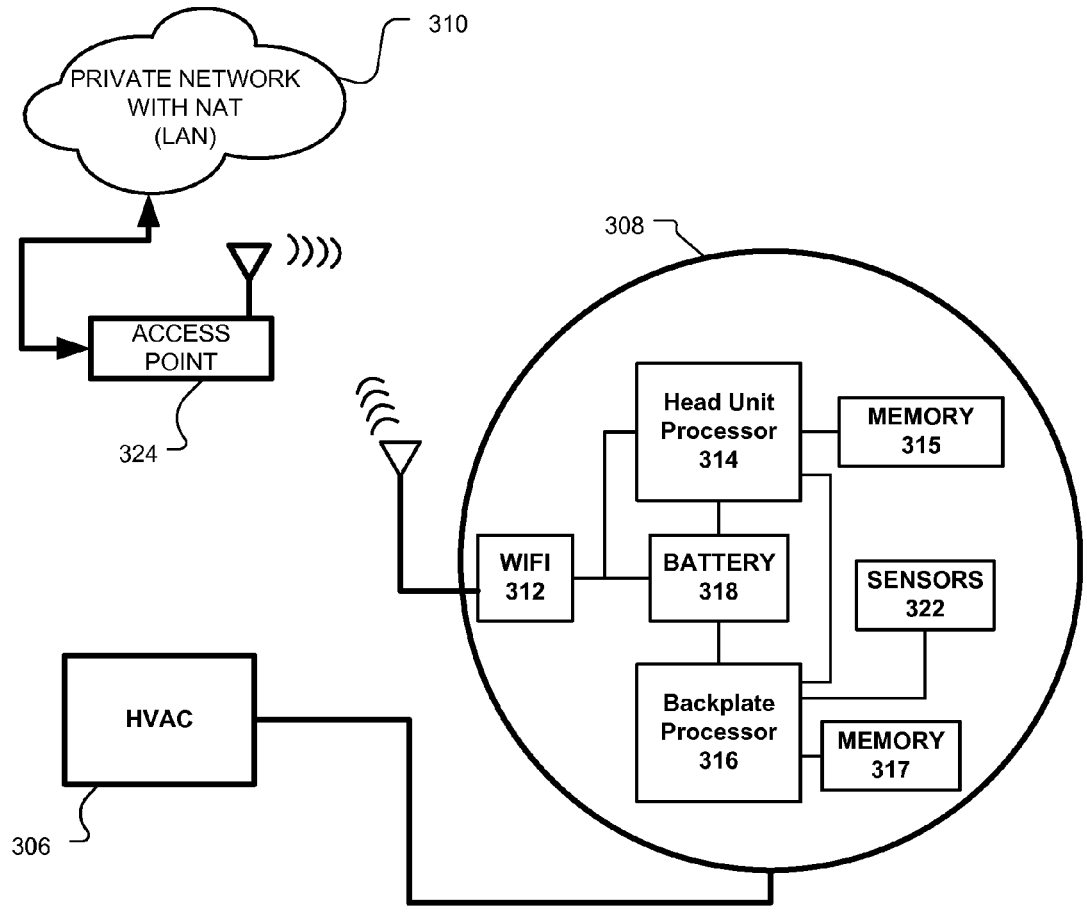
FIG. 3A is a block diagram showing an overview of components inside a thermostat in accordance with embodiments of the present invention.

Referring to FIG. 3A, a schematic block diagram provides an overview of some components inside a thermostat in accordance with embodiments of the present invention. Thermostat 308 is similar to thermostat 112 in FIG. 1 except that thermostat 308 also illustrates and highlights selected internal components including a Wi-Fi module 312 and antenna, a head unit processor 314 with associated memory 315, a backplate processor 316 with associated memory, and sensors 322 (e.g., temperature, humidity, motion, ambient light, proximity). In one embodiment, head unit processor 314 can be a Texas Instruments AM3703 Sitara ARM microprocessor while backplate processor 316, which may be more specifically referenced to as a "microcontroller", can be a Texas Instruments MSP430F microcontroller. Further details regarding the physical placement and configuration of the thermostat head unit, backplate, and other physical elements are described in the commonly assigned U.S. Ser. No. 13/199, 108, supra.

For some embodiments, the backplate processor 316 is a very low-power device that, while having some computational capabilities, is substantially less powerful than the head unit processor 314. The backplate processor 316 is coupled to, and responsible for polling on a regular basis, most or all of the sensors 322 including the temperature and humidity sensors, motion sensors, ambient light sensors, and proximity sensors. For sensors 322 that may not be located on the backplate hardware itself but rather are located in the head unit, ribbon cables or other electrical connections between the head unit and backplate are provided for this purpose. Notably, there may be other sensors (not shown) for which the head unit processor 314 is responsible, with one example being a ring rotation sensor that senses the user rotation of an outer ring of the thermostat. Each of the head unit processor 314 and backplate processor 316 is capable of entering into a "sleep" state, and then "waking up" to perform various tasks.

The backplate processor 316, which in some embodiments will have a low-power sleep state that corresponds simply to a lower clock speed, generally enters into and out of its sleep mode substantially more often than does the more powerful head unit processor 314. The backplate processor 316 is capable of waking up the head unit processor 314 from its sleep state. For one preferred embodiment directed to optimal battery conservation, the head unit processor 314 is allowed to sleep when its operations are not being called for, while the backplate processor 316 performs polling of the sensors 322 on an ongoing basis, maintaining the sensor results in memory 317. The backplate processor 316 will wake up the head unit processor 314 in the event that (i) the sensor data indicates that an HVAC operation may be called for, such as if the current temperature goes below a currently active heating setpoint, or (ii) the memory 317 gets full and the sensor data needs to be transferred up to the head unit processor 314 for storage in the memory 315. The sensor data can then be pushed up to the cloud server (thermostat management server) during a subsequent active communication session between the cloud server and the head unit processor 314.

In the case of Wi-Fi module 312, one embodiment may be implemented using Murata Wireless Solutions LBWA19XSLZ module, which is based on the Texas Instruments WL1270 chipset supporting the 802.11 b/g/n WLAN standard. Embodiments of the present invention configure and program Wi-Fi module 312 to allow thermostat 308 to enter into a low power or "sleep" mode to conserve energy until one or several events occurs. For example, in some embodiments the Wi-Fi module 312 may leave this low power mode when a user physically operates thermostat 308, which in turn may also cause activation of both head-unit processor 314 and backplate processor 316 for controlling functions in head-unit and backplate portions of thermostat 110.

It is also possible for Wi-Fi module 312 to wake from a low power mode at regular intervals in response to a beacon from wireless access point 372. To conserve energy, Wi-Fi module 312 may briefly leave the low power mode to acknowledge the beacon as dictated by the appropriate wireless standard and then return to a low power mode without activating the processors or other components of thermostat 308 in FIG. 3A. In an alternative embodiment, Wi-Fi module 312 may also respond to the beacon by awaking briefly and then activating backplate processor 316, head unit processor 314, or other portions of thermostat 308 to gather data through sensors 322 and store the results in a data log 326 with a time stamp, event type and corresponding data listed for future reference. In accordance with one embodiment, backplate processor 316 may collect data in data log 326 and store in memory 320 for a period of time or until the log reaches a maximum predetermined size. At that point, the backplate processor 316 may wake head unit processor 314 to coordinate an upload of the data log 326 stored in memory 320 over a public network, such as the Internet, to a cloud-based management server. Uploading data log 326 less frequently saves time and energy associated with more frequent transmission of individual records or log entries.

In yet another embodiment, Wi-Fi module 312 may selectively filter an incoming data packet to determine if the header is merely an acknowledgement packet (i.e., a keep-alive packet) or contains a payload that needs further processing. If the packet contains only a header and no payload, the Wi-Fi module 312 may be configured to either ignore the packet or send a return acknowledgement to the thermostat management system or other source of the packet received.

In further embodiments, Wi-Fi module 312 may be used to establish multiple communication channels between thermostat 112 and a cloud-based management server as will be described and illustrated later in this disclosure. As previously described, thermostat 112 uses multiple communication channels to receive different types of data classified with different levels of priority. In one embodiment, Wi-Fi module 312 may be programmed to use one or more filters and a wake-on-LAN feature to then selectively ignore or discard data arriving over one or more of these communication channels. For example, low-priority data arriving over a port on Wi-Fi module 312 may be discarded by disabling the corresponding wake-on-LAN feature associated with the port. This allows the communication channel to continue to operate yet conserves battery power by discarding or ignoring the low-priority packets.

Operation of the microprocessors 914, 916, Wi-Fi module 312, and other electronics may be powered by a rechargeable battery (not shown) located within the thermostat 110. In some embodiments, the battery is recharged directly using 24 VAC power off a "C" wire drawn from the HVAC system or an AC-DC transformer coupled directly into the thermostat 110. Alternatively, one or more different types of energy harvesting may also be used to recharge the internal battery if these direct methods are not available as described, for example, in U.S. Ser. No. 13/034,678, supra, and U.S. Ser. No. 13/267, 871, supra. Embodiments of the present invention communicate and operate the thermostat 110 in a manner that promotes efficient use of the battery while also keeping the thermostat operating at a high level of performance and responsiveness controlling the HVAC system. Some embodiments may use the battery-level charge and the priority or relative importance of a communication to determine when a thermostat management system located on a public network such as the Internet may communicate with the thermostat 110. Further details on the communication methods and system used in accordance with these embodiments are described in detail later herein.

Figure 3B:
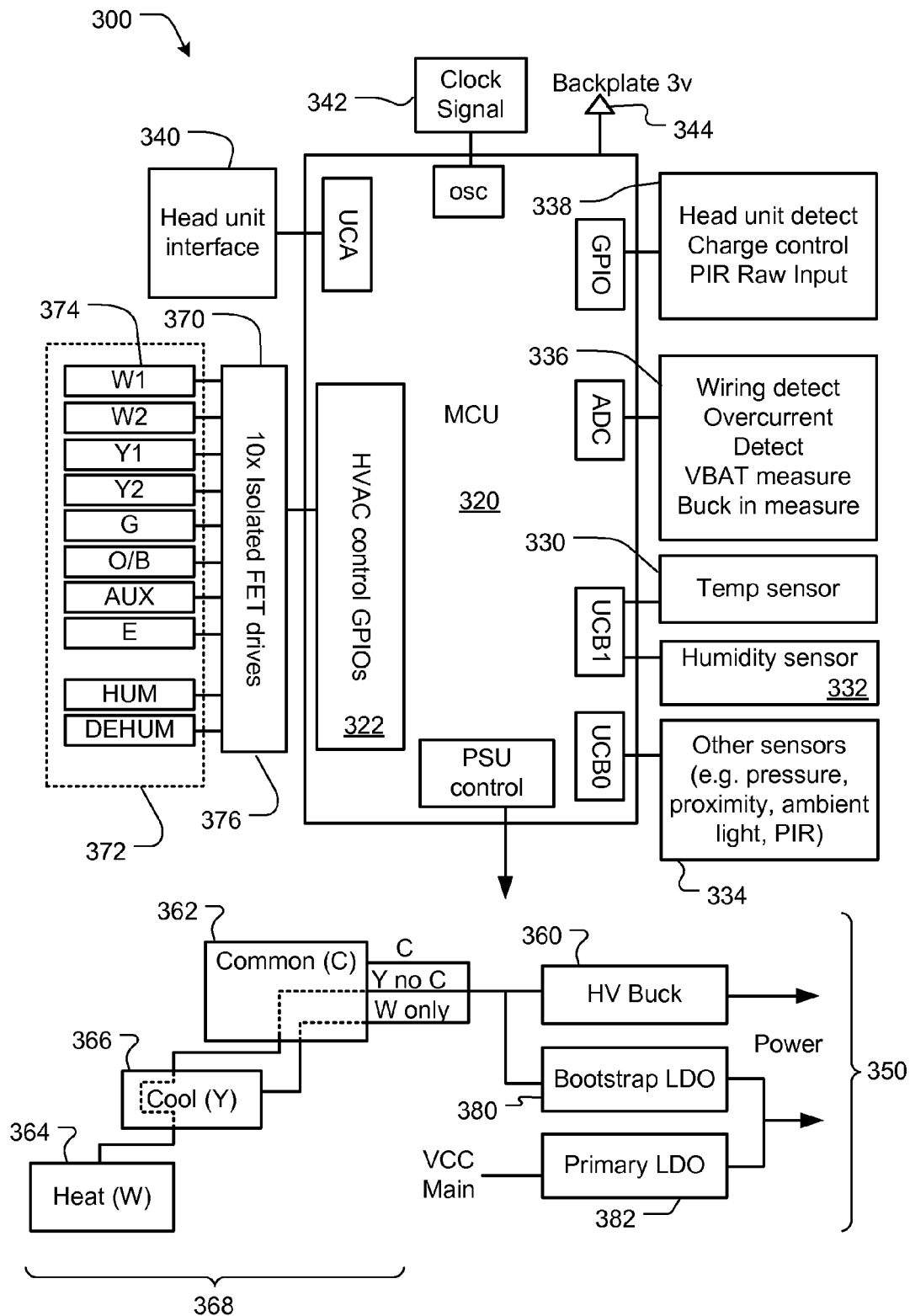
FIG. 3B is a simplified block diagram illustrating the components of a thermostat according to some embodiments.

Turning now to power harvesting methods and systems, FIG. 3B is a block diagram of some circuitry of a thermostat, according to some embodiments. Circuitry 300, according to some embodiments, is a backplate of a thermostat. A number of HVAC wires can be attached using HVAC terminals 372. One example of which is the W1 terminal 374. Each terminal is used to control an HVAC function. According to some embodiments, each of the wires from the terminals W1, W2, Y1, Y2, G, O/B, AUX and E is connected to separate isolated FET drives 370. The common HVAC functions for each of the terminals are: W1 and W2 heating; Y1 and Y2 for cooling; G for fan; O/B for heat pumps; and E for emergency heat. Note that although the circuitry 300 is able control 8 functions using the isolated FET drives 370, according to some embodiments, other functions, or fewer functions can be controlled. For example circuitry for a more simply equipped HVAC system may only have a single heating (W), and single cooling (Y) and a fan (G), in which case there would only be three isolated FET drives 370. According to a preferred embodiment, 5 FET drives 370 are provided, namely heating (W), cooling (Y), fan (G), auxiliary (AUX) and compressor direction (0/B). Not shown are the circuit returns such as RH (return for heat) and RC (return for cooling). According to some embodiments the thermostat can control a humidifier and/or de-humidifier. Further details relating to isolated FET drives 370 are described in co-pending U.S. patent application Ser. No. 13/034,674, entitled "Thermostat Circuitry for Connection to HVAC Systems," supra, which is incorporated herein by reference.

The HVAC functions are controlled by the HVAC control general purpose input/outputs (GPIOs) 322 within microcontroller (MCU) 320. MCU 320 is a general purpose microcontroller such as the MSP430 16-bit ultra-low power MCU available from Texas Instruments. MCU 320 communicates with the head unit via Head Unit Interface 340. The head unit together with the backplate make up the thermostat. The head unit has user interface capability such that it can display information to a user via an LCD display and receive input from a user via buttons and/or touch screen input devices. According to some embodiments, the head unit has network capabilities for communication to other devices either locally or over the internet. Through such network capability, for example, the thermostat can send information and receive commands and setting from a computer located elsewhere inside or outside of the enclosure. The MCU detects whether the head unit is attached to the backplate via head unit detect 338.

Clock 342 provides a low frequency clock signal to MCU 320, for example 32.768 kHz. According to some embodiments there are two crystal oscillators, one for high frequency such as 16 MHz and one for the lower frequency. Power for MCU 320 is supplied at power input 344 at 3.0 V. Circuitry 336 provides wiring detection, battery measurement, and buck input measurement. A temperature sensor 330 is provided, and according to some embodiments and a humidity sensor 332 are provided. According to some embodiments, one or more other sensors 334 are provided such as: pressure, proximity (e.g. using infrared), ambient light, and pyroelectric infrared (PIR).

Power circuitry 350 is provided to supply power. According to some embodiments, when the thermostat is first turned on with insufficient battery power, a bootstrap power system is provided. A high voltage low dropout voltage regulator (LDO) 380 provides 3.0 volts of power for the bootstrap of the MCU 320. The bootstrap function can be disabled under MCU control but according to some embodiments the bootstrap function is left enabled to provide a "safety net" if the head unit supply vanishes for any reason. For example, if the head-unit includes the re-chargeable battery 384 and is removed unexpectedly, the power would be lost and the bootstrap function would operate. The input to this Bootstrap LDO 380 is provided by connectors and circuitry 368 that automatically selects power from common 362 (highest priority), cool 366 (lower priority); or heat (lowest priority) 364.

In normal operation, a 3.0 volt primary LDO 382 powers the backplate circuitry and itself is powered by VCC Main. According to some embodiments, high voltage buck 360 is provided as a second supply in the backplate. The input to this supply is the circuitry 368. According to some embodiments, the high voltage buck 380 can supply a maximum of 100 mA at 4.5 v. According to some embodiments, the VCC main and the Primary LDO 382 can be powered by a rechargeable battery (shown in FIG. 7) in cases where there is no alternative power source (such as the high voltage buck or USB power, for example).

Figure 4C:
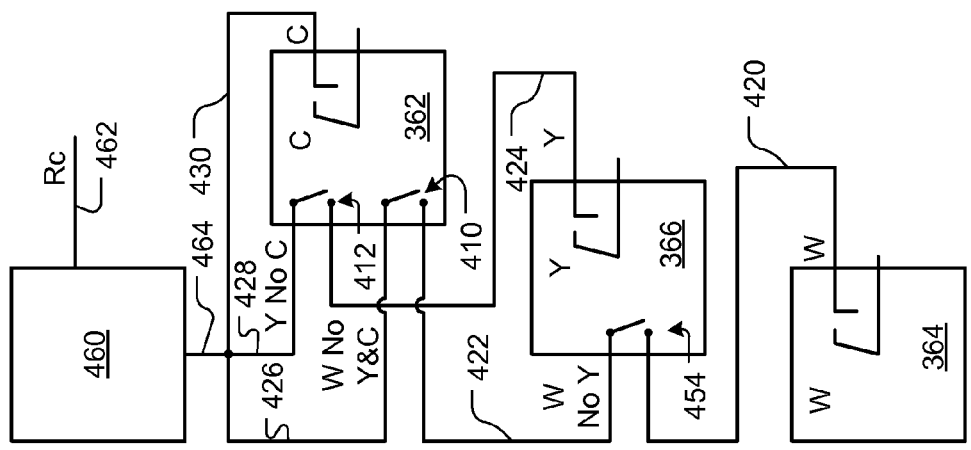
FIGS. 4A-4C are schematic diagrams illustrating auto-switching connectors for automatically selecting a source for power harvesting according to some embodiments.
Figure 4B:
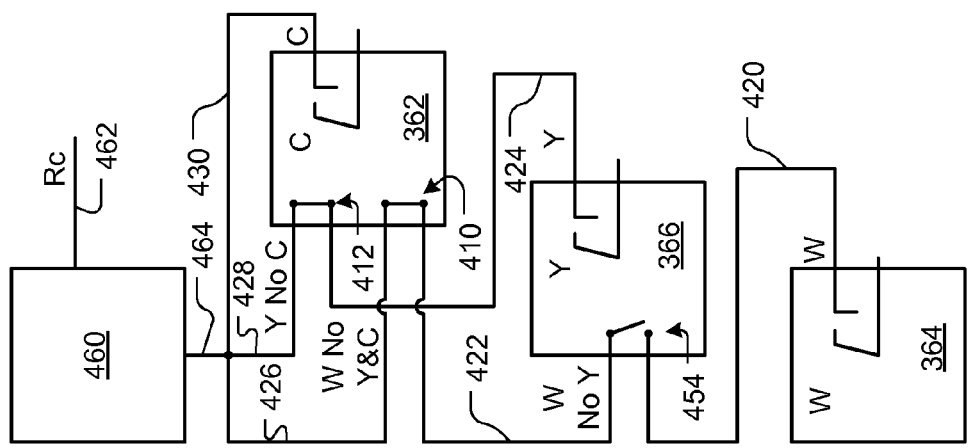
Figure 4A:
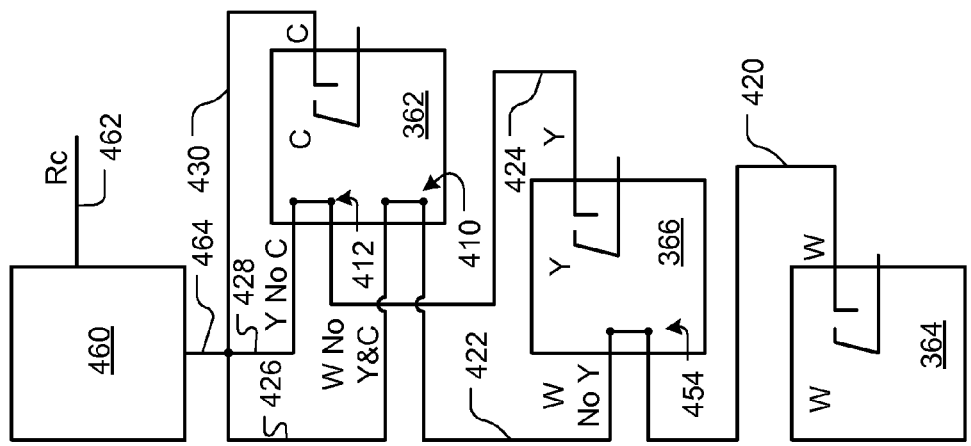

FIGS. 4A-4C schematically illustrate the use of auto-switching connectors to automatically select a source for power harvesting, according to some embodiments. The connectors 362, 364, and 366 are connectors as shown in FIG. 3B. For further details regarding preferred automatically switching connectors, see co-pending U.S. patent application Ser. No. 13/034,666, entitled "Thermostat Wiring Connector" filed Feb. 24, 2011 and incorporated herein by reference. The connector 362 is used for connection to an HVAC "C" (common) wire and includes two switched pairs of normally closed secondary conductors 410 and 412. The connector 366 is used for connection to an HVAC "Y" (cooling) wire and includes one switched pair of normally closed secondary conductors 454. The connector 364 is used for connection to an HVAC "W" (heating) wire. Note that although not shown in FIGS. 4A-4C, one or more additional pairs of switched secondary conductors can be provided with any of the connectors 362, 364, and 366, such as could be used for the purpose of electronically detecting the presence of an HVAC system wire to the connector. Power harvesting circuitry 460 is used to supply power to the thermostat and is also connected to the Rc wire 462 (or according to other embodiment the Rh wire). For example, the power harvesting circuitry 460 can include the HV buck 360 and Bootstrap LDO 380 as shown in and described with respect to FIGS. 3B and 6A-B.

FIG. 4A shows the states of switches 454, 410, and 412, when no C wire and no Y wire is attached. In this case all of the switches 454, 410, and 412 are closed, and the power harvesting circuitry 460 is connected at input 464 with the W wire via circuit paths 420, 422 and 426. FIG. 4B shows the states of switches 454, 410, and 412, when no C wire is attached but there is a Y wire attached. In this case switches 410 and 412 are closed, but switch 454 is opened due to the presence of the Y wire. In this case the power harvesting circuitry 460 is connected at input 464 with the Y wire via circuit paths 424 and 428. FIG. 4C shows the states of switches 454, 410, and 412, when both C and Y wires are attached. In this case all the switches 454, 410, and 412 are open and the power harvesting circuitry 460 is connected at input 464 with the C wire via circuit path 430. Note that the case of a connection of C and W wires and no Y wire is not shown, but that in this case the W wire would not be connected to circuitry 420 since switch 410 would be open. Thus, through the use of circuitry and the connectors shown, the power harvesting circuitry is automatically switched so as to use connections to C, Y and W wires in decreasing order of priority. Preferably, the C wire is the highest priority as this ordinarily provides the best power source, if available. Note that according to some embodiments, the Y and W priorities are reversed to make W higher priority than Y.

Figure 5:
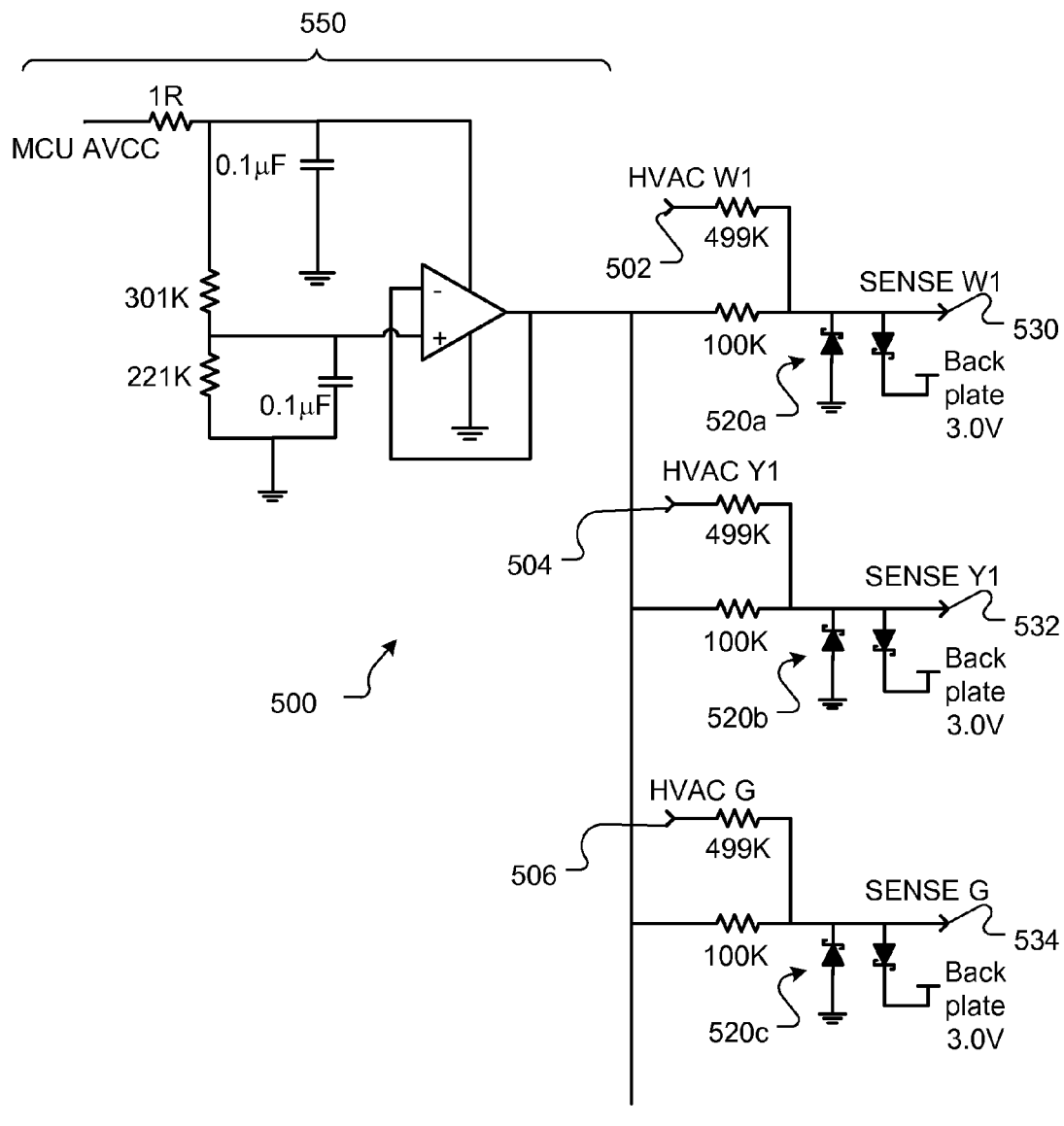
FIG. 5 is a schematic diagram illustrating a half-bridge sense circuit according to some embodiments.

FIG. 5 is a schematic diagram illustrating a half-bridge sense circuit according to some embodiments. Circuit 500 provides voltage sensing, clipped to 3.0 volts, for presence detection and current sensing. At inputs 502, 504, and 506 are the 24 VAC waveforms from three of the HVAC circuits. In the case shown in FIG. 5, inputs 502, 504 and 506 are for HVAC W1, HVAC Y1 and HVAC G, respectively. The sense input bias buffer 550 is provided as shown. Note that a voltage divider is used in each case that takes the voltage from 24 volts to approximately 4 volts. Clamp diodes 520a, 520b, and 520c ensure that the voltage goes no higher or lower than the range of the microcontroller 320 (shown in FIG. 3). The Sense outputs 530, 532, and 534 are connected to the microcontroller 320 so that the microcontroller 320 can sense the presence of a signal on the HVAC lines. The circuits are repeated for the other HVAC lines so that the microcontroller can detect signals on any of the HVAC lines.

Figure 6A:
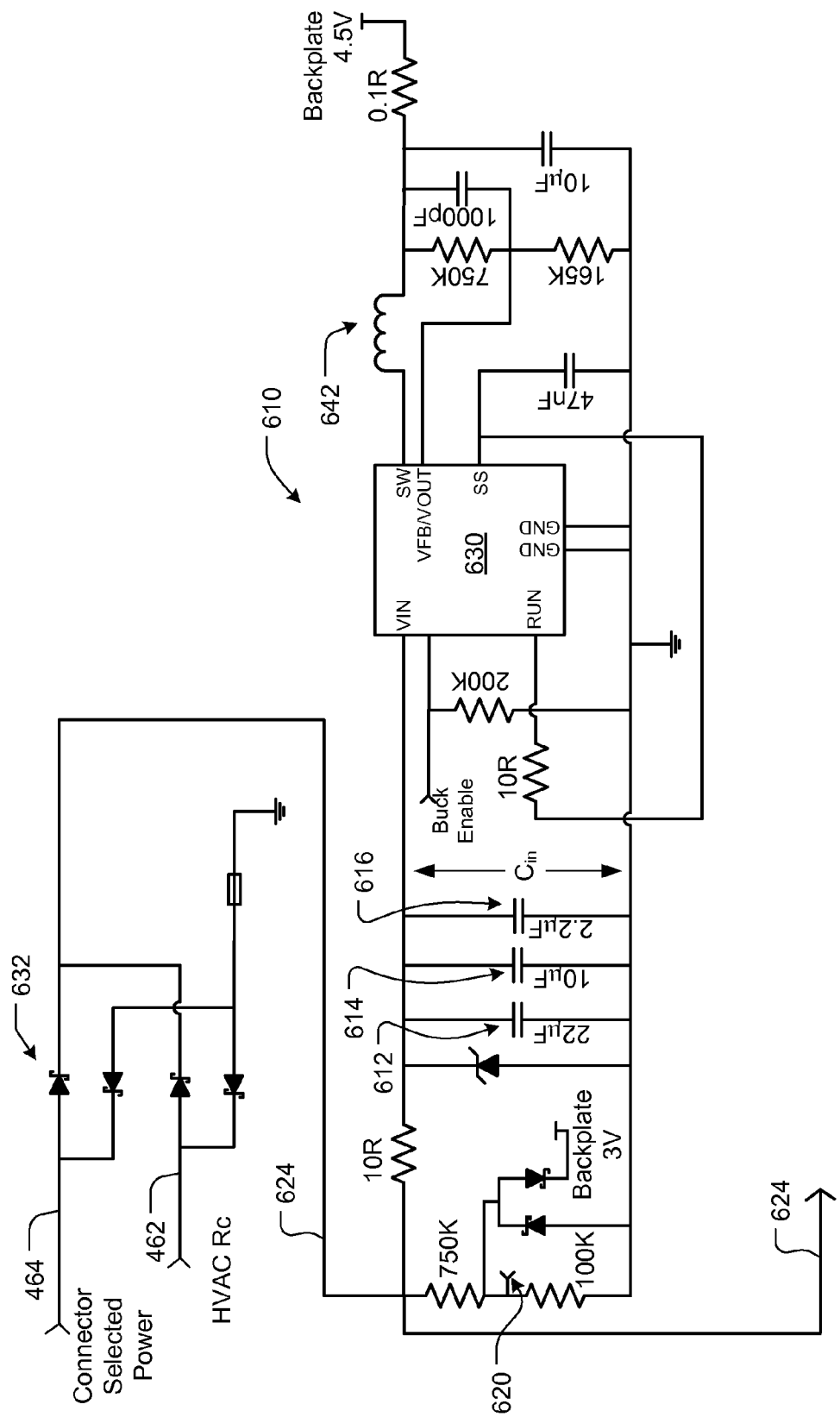
FIGS. 6A-6B are schematic diagrams showing high-voltage buck, bootstrap LDO and battery LDO power circuitry according to some embodiments.
Figure 6B:
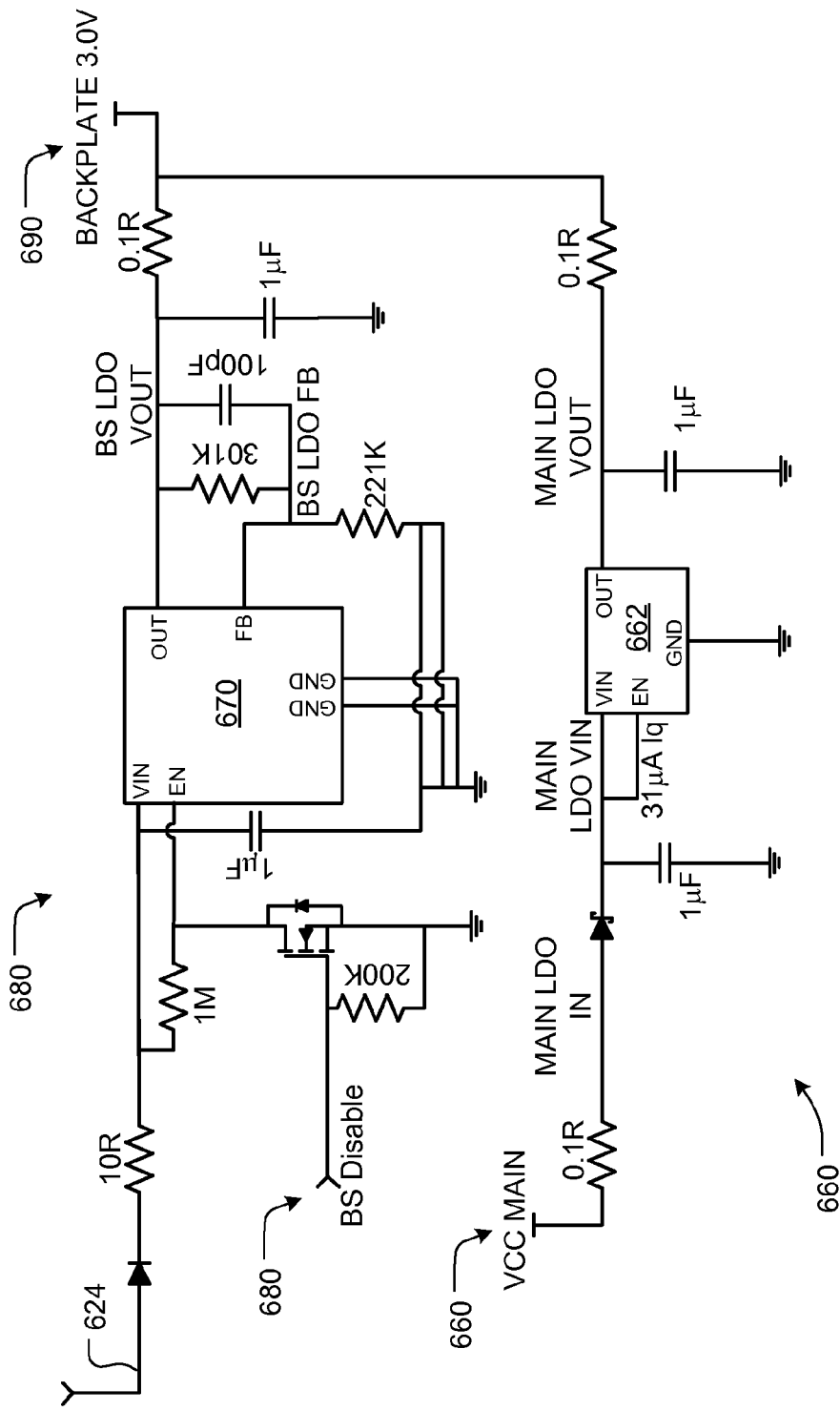

FIGS. 6A-6B are schematic diagrams showing high-voltage buck, bootstrap LDO and battery LDO power circuitry according to some embodiments. FIG. 6A shows the input 464 from the connector selected power, which corresponds to input 464 to power circuitry 460 in FIG. 4. The diodes 632 are used to rectify the AC power signal from the HVAC power transformer wire that is selected by the connector circuitry shown in FIG. 4. When the thermostat is installed in a building having two HVAC power transformers, such as may be the case when an existing HVAC heating-only system is upgraded to add an HVAC cooling system. In such cases, there are two power wires from the HVAC system, often called "Rh" the power wire directly from the heating system transformer, and "Rc" the power wire directly from the cooling transformer. Input 462 is from a terminal connected to the Rc wire. According to some embodiments, the Rc and Rh terminals are switched using automatic switching or other jumperless design, as shown and described in co-pending U.S. patent application Ser. No. 13/034,674, entitled "Thermostat Circuitry for Connection to HVAC Systems," filed Feb. 24, 2011 and incorporated herein by reference.

Rectified input 624 is input to the high voltage buck circuit 610, according to some embodiments. In buck circuit 610, which corresponds to high voltage buck 360 in FIG. 3, the voltage on the input capacitors 612, 614 and 616 of high voltage buck 610 can be measured by the MCU 320 (of FIG. 3) at node 620, allowing the MCU to momentarily open the W1 or Y1 contacts during an "enabled" or "on" phase in order to recharge the buck input capacitors 612, 614 and 616 and continue power harvesting. According to some embodiments, the same HVAC circuit (e.g. heating or cooling) is used for power harvesting, whether or not there is more than one HVAC function in the system. According to some other embodiments, when the thermostat is used with an HVAC system having two circuits (e.g. heating and cooling), the system will harvest power from the non-activated circuit. In cases where a common wire is available from the HVAC power transformer, the system preferably does not power harvest at all from the heating and cooling circuits. According to some embodiments, the step down converter 630 is a high efficiency, high voltage 100 mA synchronous step-down converter such as the LTC3631 from Linear Technology. According to some embodiments, inductor 642 is a 100 uH power inductor such as the MOS6020 from Coilcraft. According to some embodiments, one or more other types of elements in addition to or instead of input capacitors 612, 614 and 616 are used to store electrical energy during power harvesting when the HVAC function is active (or "on"). For example, magnetic elements such as inductors and/or transformers can be used.

In order to control the HVAC functions, the HVAC function wire is shorted to the return or power wire. For example, in the case of heating, the W wire is shorted to the Rh (or R or Rc depending on the configuration). In the case of cooling the Y wire is shorted to the Rc (or R or Rh depending on the configuration). By shorting these two wires, the 24 VAC transformer is placed in series with a relay that controls the HVAC function. However, for power harvesting, a problem is that when these wires are shorted, there is no voltage across them, and when open, there is no current flow. Since power equals voltage multiplied by current, if either quantity is zero the power that can be extracted is zero. According to some embodiments, the power harvesting circuitry allows power to be taken from the two wires in both the states of HVAC—the HVAC "on" and the HVAC "off".

In the HVAC "off" state, some energy can be harvested from these two wires by taking less energy than would cause the relay to turn on, which would cause the HVAC function to erroneously turn on. Based on testing, it has been found that HVAC functions generally do not turn on when (0.040A*4.5V)=0.180 watts is extracted at the output. So after the input diodes, capacitors, and switching regulator, this allows us to take 40 mA at 4.5 volts from these wires without turning on the HVAC system.

In the HVAC "on" state, the two wires must be connected together to allow current to flow, which turns on the HVAC relay. This, however, shorts out the input supply, so our system does not get any power when the HVAC "on" switch is closed. To get around this problem, the voltage is monitored on the capacitors 612, 614 and 616 at the input switching power supply node 620. When the voltage on these capacitors "$C_{in}$," drops close to the point at which the switching power supply would "Drop out" and lose output regulation, for example at about +8 Volts, the HVAC "on" switch is turned off and $C_{in}$ is charged. During the time that $C_{in}$ is charging, current is still flowing in the HVAC relay, so the HVAC relay stays on. When the $C_{in}$ capacitor voltages increases some amount, for example about +16 Volts, the HVAC "on" switch is closed again, $C_{in}$ begins to discharge while it feeds the switching regulator, and current continues to flow in the HVAC relay. Note that $C_{in}$ is not allowed to discharge back to the HVAC "on" switch due to input diodes 632. When the voltage on $C_{in}$ drops to about +8 Volts the HVAC "on" switch is turned off and the process repeats. This continues until the system tells the HVAC "on" switch to go off because HVAC is no longer needed. According to some embodiments, the ability of the HVAC "on" switch to turn on and off relatively quickly is provided by circuitry 450 as shown in and described with respect to FIG. 4 of co-pending U.S. patent application Ser. No. 13/034,674, entitled "Thermostat Circuitry for Connection to HVAC Systems," supra, which is incorporated herein by reference.

According to some embodiments, one or more alternative power harvesting techniques are used. For example, rather than having the HVAC "on" switch turn on when the voltage on $C_{in}$ reaches a certain point, it the system might turn off the "HVAC "on" switch for a predetermined period of time instead. According to some embodiments, power harvesting is enhanced by synchronizing the power harvesting with the AC current waveform.

FIG. 6B is a schematic of high voltage low dropout voltage regulators used to provide bootstrap power and battery, according to some embodiments. The bootstrap LDO circuitry 680, and battery LDO circuitry correspond to the bootstrap LDO 380 and battery LDO 382 in FIG. 3 respectively. Rectified input 624 is input to bootstrap circuit 680. According to some embodiments, regulator 670 is low-dropout linear regulator such as the TPS79801 from Texas Instruments. The output power 690 is provided to the backplate at 3.0V. The bootstrap disable signal 680 can be used to disable the bootstrap power unit, as shown. The input 660 comes from VCC main, which can be, for example, from the rechargeable battery. According to some embodiments, the low dropout regulator 662 is a low quiescent current device designed for power-sensitive applications such as the TLV70030 from Texas Instruments.

Figure 6C:
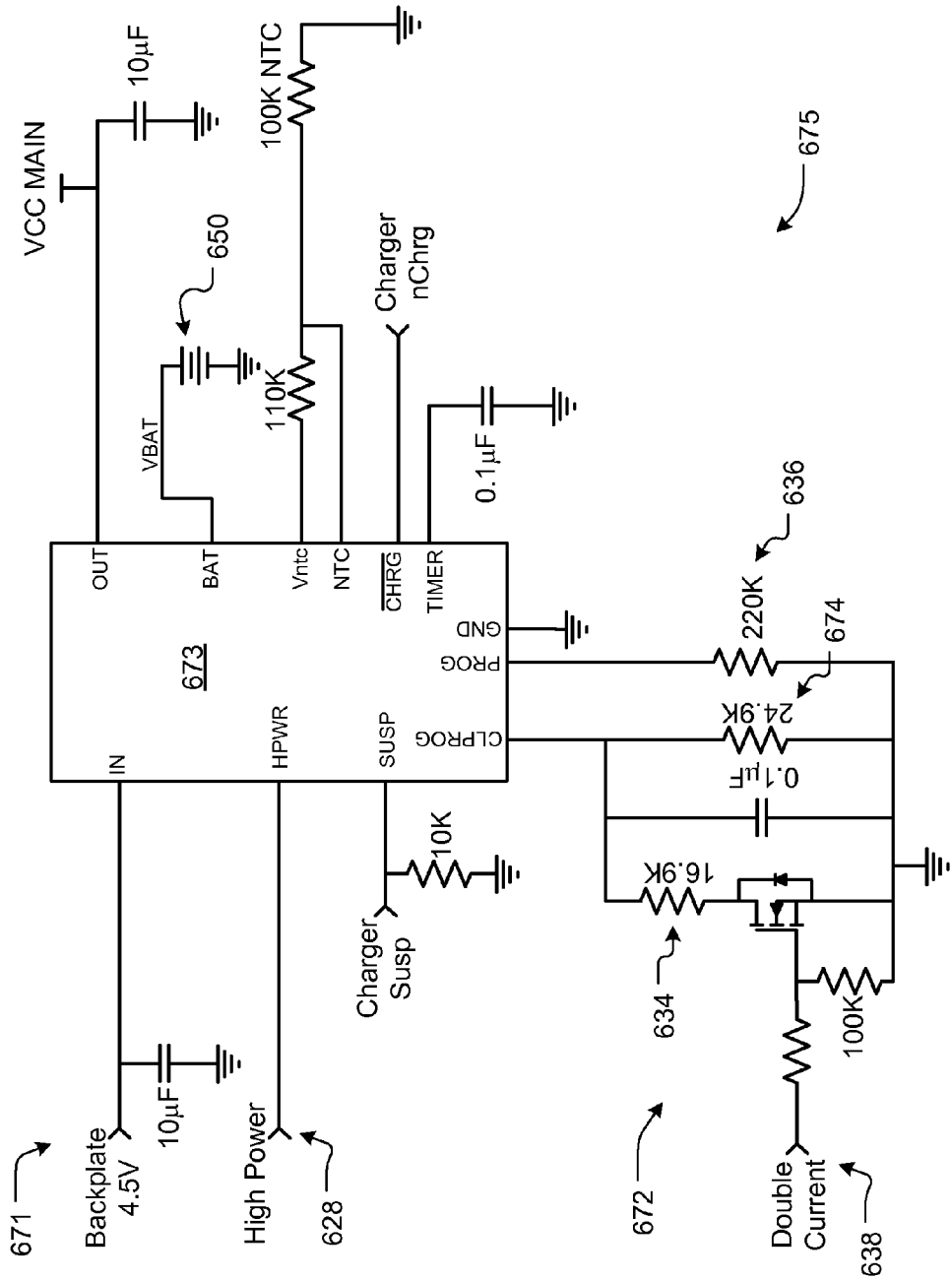
FIG. 6C is a schematic diagram showing a battery charging circuit with a rechargeable battery, according to some embodiments.

FIG. 6C shows a battery charging circuit 675 and a rechargeable battery 650, according to some embodiments. The charger 673 is used to charge the lithium-ion battery 650. In general, li-ion battery capacity depends on what voltage the battery is charged to, and the cycle life depends on the charged voltage, how fast the battery is charged and the temperature during which the battery is charged. Ordinarily, Li-ion batteries are charged at about 4.2V. In some cases the charging voltage is even higher in an attempt to gain greater capacity, but at the expense of decreased cycle life. However, in the case of the rechargeable battery 650 for use with a wall-mounted thermostat, a greater cycle life is preferred over capacity. High capacity is generally not needed since charging power is available via the power harvesting circuitry, and greater cycle life is preferred since user replacement may be difficult or unavailable. Thus, according to some embodiments, a low charging speed, low final float voltage and reduced charging temperature range is preferred. According to some embodiments, a final float voltage of between 3.9V and 4.1V is used. According to some embodiments a final float voltage of less than 4.0V is used, such as 3.95V. According to some embodiments, the ratio of charge current to total capacity "C" is also controlled, such as charging the battery to 0.2C (0.2 times the rated capacity) to provide better cycle life than a higher ratio. According to some embodiments, using a lower charging current aids in avoiding unintended tripping of the HVAC relay.

According to some embodiments, charger 673 is a USB power manager and li-ion battery charger such as the LTC4085-3 from Linear Technology. Backplate voltage 671 is input to charger 673. The circuitry 672 is used to select the charging current. In particular the value of resistor 674 (24.9 k) in parallel with resistor 634 (16.9 k) in combination with the inputs Double Current 638 and High Power 628 are used to select the charging current. If High Power 628 and Double Current 638 are both set to 0, then the charging current is 8.0 mA; if the High Power 628 is set to 0 and Double Current 638 is set to 1, then the charging current is 19.9 mA; if the High Power 628 is set to 1 and Double Current 638 is set to 0, then the charging current is 40.1 mA; and if the High Power 628 and Double Current 638 are both set to 1, then the charging current is 99.3 mA. Resistor 636 is used to set the default charge current. In the case shown, a 220 k resistor set the default charge current to 227 mA. According to some embodiments, a charge temperature range of 0-44 degrees C. is set via the Thermistor Monitoring Circuits.

According to some embodiments, the thermostat is capable of being powered by a USB power supply. This could be supplied by a user, for example, by attaching the thermostat via a USB cable to a computer or another USB power supply. In cases where USB power supply is available, it is selected as the preferred power source for the thermostat and can be used to recharge the rechargeable battery. According to some embodiments, a charge current of about 227 mA is used when a USB supply source is available; a charge current of about 100 mA is used when an HVAC common wire is present; and a charge current of between about 20-40 mA is used when power is harvested from an HVAC heating and/or cooling circuit.

Figure 7:
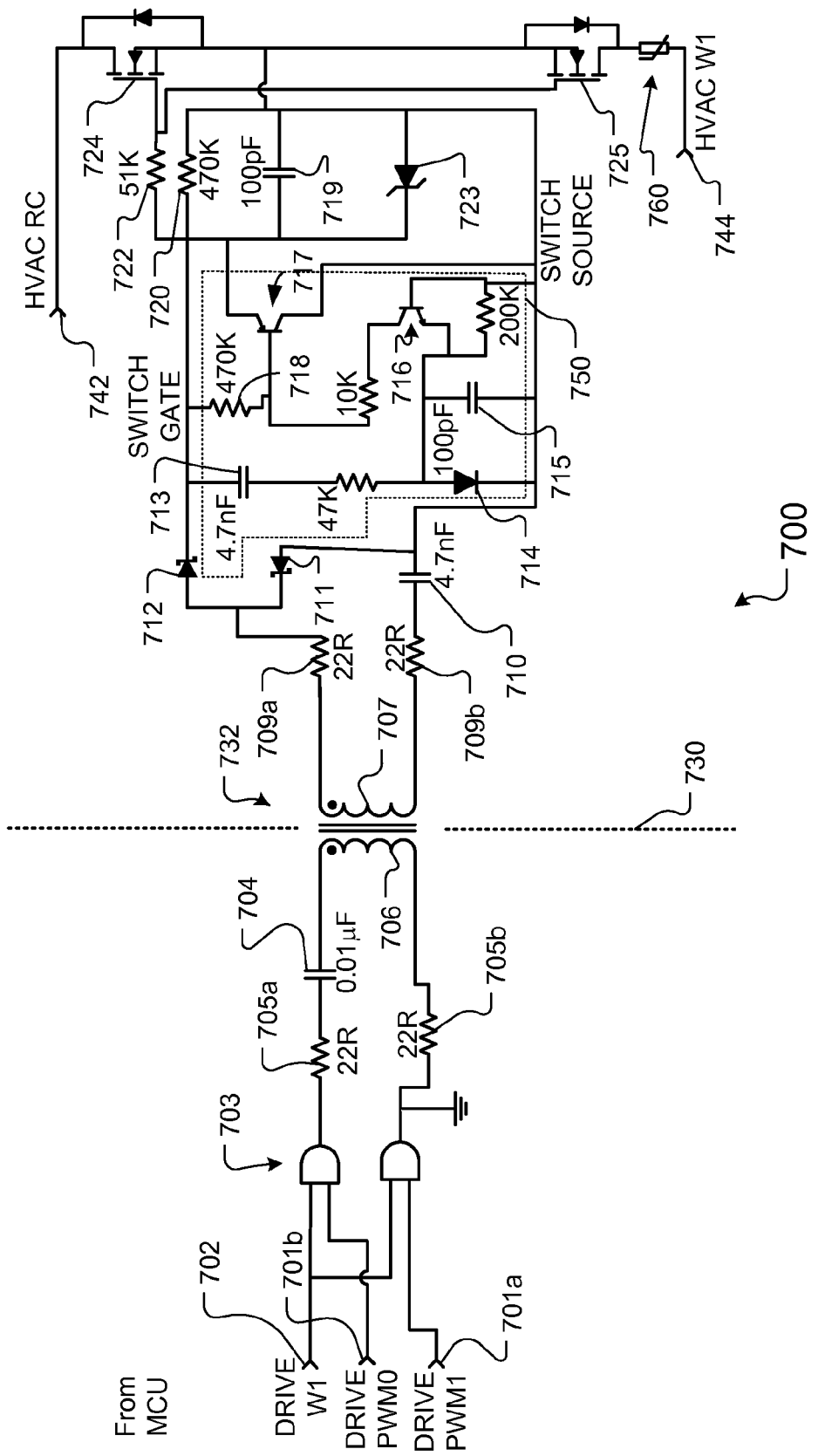
FIG. 7 is a schematic diagram illustrating a solid-state electronic AC switch with a transformer isolated control input according to some embodiments.

FIG. 7 is a schematic diagram illustrating a solid-state electronic AC switch with a transformer isolated control input according to some embodiments. Sub-circuit 700 controls a bidirectional power switch, which is an AC switch between terminals 742 and 744, by sending a control signal across an isolation barrier 730 as a high frequency AC signal. The control signal is rectified and filtered and applied to the gates of two N-channel MOSFETs 724 and 725. The switch is on when the DC gate to source voltage of the MOSFETs 724 and 725 is above the threshold voltage of the MOSFETs. Both MOSFETs 724 and 725 see essentially the same gate to source voltage. Additional circuitry is added to turn the switch off quickly shortly after the control signal is stopped.

Inputs 701a and 701b are a logic level clock signal from the MCU, and are preferably differential signals. Inputs 701a and 701b generate the frequency that is coupled across the isolation component. According to some embodiments, inputs 701a and 701b are not at a fixed frequency, but rather a spread spectrum. Input 702 enables the AND gates 703. AND gates 703 are AND logic gates that generate a buffered AC signal for driving the transformer 732. An example of a suitable logic component for AND gates 703 is a dual buffer/driver such as the SN74LVC2G08 from Texas Instruments.

An AC coupling capacitor 704 prevents DC current from flowing in the transformer, which would reduce efficiency and could degrade operation due to transformer saturation. Resistors 705a and 705b work in conjunction with stray capacitances to round the sharp edges of the clock signals, limit instantaneous currents, and damp resonant circuits, and help to reduces EMI (Electromagnetic Interference).

It should be noted that other topologies of driver circuits could be used for 701-705 above, according to other embodiments. The embodiment shown in FIG. 7 has been found to reduce drive power requirements to a very low level.

Transformer 732 includes a primary winding 706 and a secondary winding 707. The transformer 732 provides isolation, such that the switch could be at a different potential from the control circuitry. According to some embodiments, transformer 732 is an Ethernet transformer. Ethernet transformers have been found to work well with a very low cost. According to the other embodiments, other styles of transformers could be used. According to some embodiments, coupled inductors such as LPD3015 series from Coilcraft are used. According to some embodiments, the transformer 732 is replaced with capacitors, as this is an alternative way to get AC energy across a boundary 730.

Transformer 732 has a primary winding 706 to secondary winding 707 turns ratio of 1:1, although other windings ratios can be used according to other embodiments. With ±3 volts across the primary winding of the transformer, a 1:1 ratio transformer generates about +6 volts of gate to source voltage on the FETs 724 and 725. A modified push pull topology is shown in FIG. 7. However, according to other embodiments, other topologies including forward, flyback, and push pull could be used. Resistors 709a and 709b work in conjunction with stray capacitances to round sharp edges of the clock signals, limit instantaneous currents, and damp resonant circuits, and help to reduce EMI (Electromagnetic Interference).

AC coupling capacitor 710 accumulates a DC voltage across it in normal operation which is approximately the output gate to source voltage divided by 2. Capacitor 710 allows transformer 732 to be used more effectively. If capacitor 710 is shorted, then the output voltage may be half of what it should be.

Bottom diode 711 is on for half the cycle, and enables capacitor 710 to charge to half the output voltage. Top diode 712 is on for the other half of the cycle, and peak detects the voltage on capacitor 410 with the voltage across the transformer, resulting in a rectified output voltage across capacitor 719.

Circuit 750 is used to enable a fast turn off characteristic. In FIG. 7, when the voltage at the point marked by SWITCH GATE is rising with respect to the point marked by SWITCH SOURCE, capacitor 713 charges up through diode 714. When the voltage at SWITCH GATE drops with respect to SWITCH SOURCE, capacitor 713 pulls down on the emitter of NPN transistor 716, which turns on transistor 716, which turns on PNP transistor 717 and discharges capacitor 719 (as well as the capacitances of the MOSFETs 724 and 725) and quickly turns off the switch. This fast turn off characteristic may be useful in an energy harvesting application such as described greater detail in co-pending U.S. patent application Ser. No. 13/034,678, entitled "Thermostat Battery Recharging" filed on even date herewith, and which is incorporated herein by reference. Capacitor 715 may be helpful in EMI immunity tests. Resistor 418 prevents PNP transistor 717 from turning on due to leakage currents.

Resistor 720 discharges the gate source capacitance voltage and tends to turn off the switch, and to hold it off when no control signal is present. Gate resistor 722 prevents FETs 724 and 725 from oscillating due to their follower topology. Zener diode 723 prevents the gate to source voltage from going too high, which could damage FETs 724 and 725.

FETs 724 and 725 are the main switching elements in circuit 700. FETs 724 and 725 tend to be on when the gate to source voltage is above the threshold voltage of the FETs, and tend to be off when the gate to source voltage is less than the threshold voltage. As this is a bidirectional AC Switch, two FETs are used, because if only one FET were used, the switch would be "On" for half of the AC cycle due to the drain to source body diode.

Note that the with the circuit of FIG. 7, the left side of barrier 730 is digital logic controlled by the MCU and is ground referenced, while the right side of barrier 730 is a floating solid state (using FETs) switch that does not reference a ground. The floating no-ground reference nature of the FET drive advantageously enables connection to two-transformer systems with shorted (preferably with a fuse) Rc and Rh wires. If the isolation was not present, and the right side was ground referenced, when one circuit was "on" and the other was "off" the "on" circuit would take power from the "off" circuit. Thus the design as shown in FIG. 7 allows for solid state switching of the HVAC circuits having either one or two power transformers without the need for removable jumpers during installation.

According to some embodiments, circuitry 750 provides for the connection between terminals 742 and 744 to be open very quickly when the control signal is received from the driver circuit. According to some embodiments, the fast turn-off circuitry 750 is used for isolated FET drives for HVAC wires used for power harvesting, such as W (heating) and Y (cooling), but is omitted from other isolated FET drives that are not used for power harvesting, such as for Aux, G (fan), and O/B (compressor direction).

Additionally, the circuitry shown in FIG. 7 provides for a failsafe "open," in that when there is no control signal being received, the connection between terminals 742 and 744 is in an open state. This is an important advantage over thermostat designs that use bi-stable relays for opening and closing the control circuit. Fast shut off and failsafe open features allow for safe wiring of the thermostat in HVAC system having two power transformers, such as shown below in FIG. 8A, without the need for a jumper wire to be manually removed.

According to some embodiments, the thermostat carries out current sensing through the HVAC control circuit by detecting the voltage across FETs 724 and 725. Unlike most thermostats, that use mechanical relays having virtually no measureable voltage drop to open and close the HVAC control circuit for the HVAC function, the thermostat as described herein uses solid state switching which has enough voltage drop so as to allow for current measurements. In the case of FIG. 7, the voltage measurement is made across FETs 724 and 725 (or terminals 742 and 744). The current measurement made in this fashion, according to some embodiments is used to detect faults such as a common wire plugged in to the wrong terminal (such as a "Y" or "W" terminal). According to some embodiments, a positive temperature coefficient thermistor 760 is used to detect current by measuring voltage drop, and in the case of wiring faults the thermistor also acts to limit current flow.

Figure 8A:
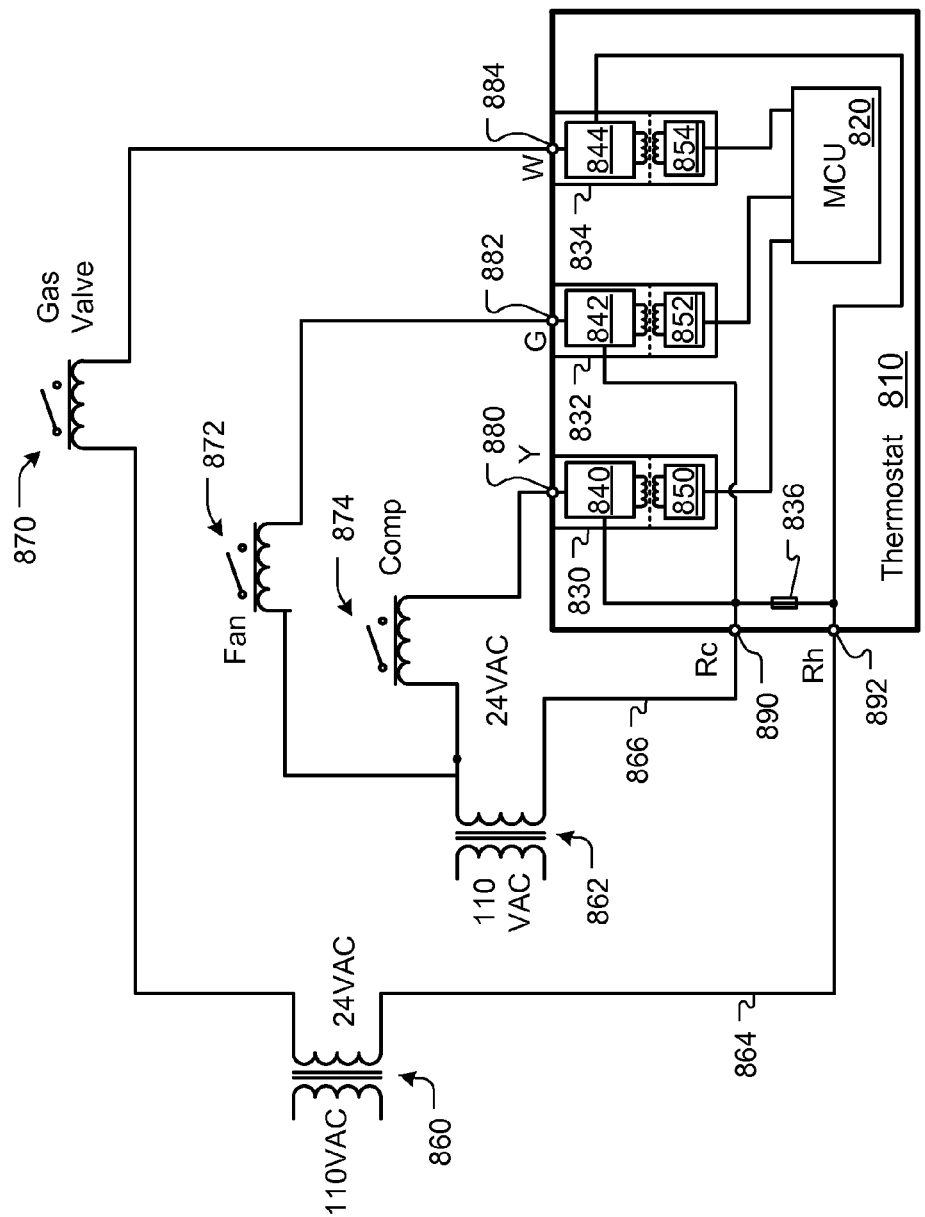
FIGS. 8A-8B are simplified schematic diagrams illustrating a jumperless thermostat connected to two different HVAC systems, respectively according to some embodiments.
Figure 8B:
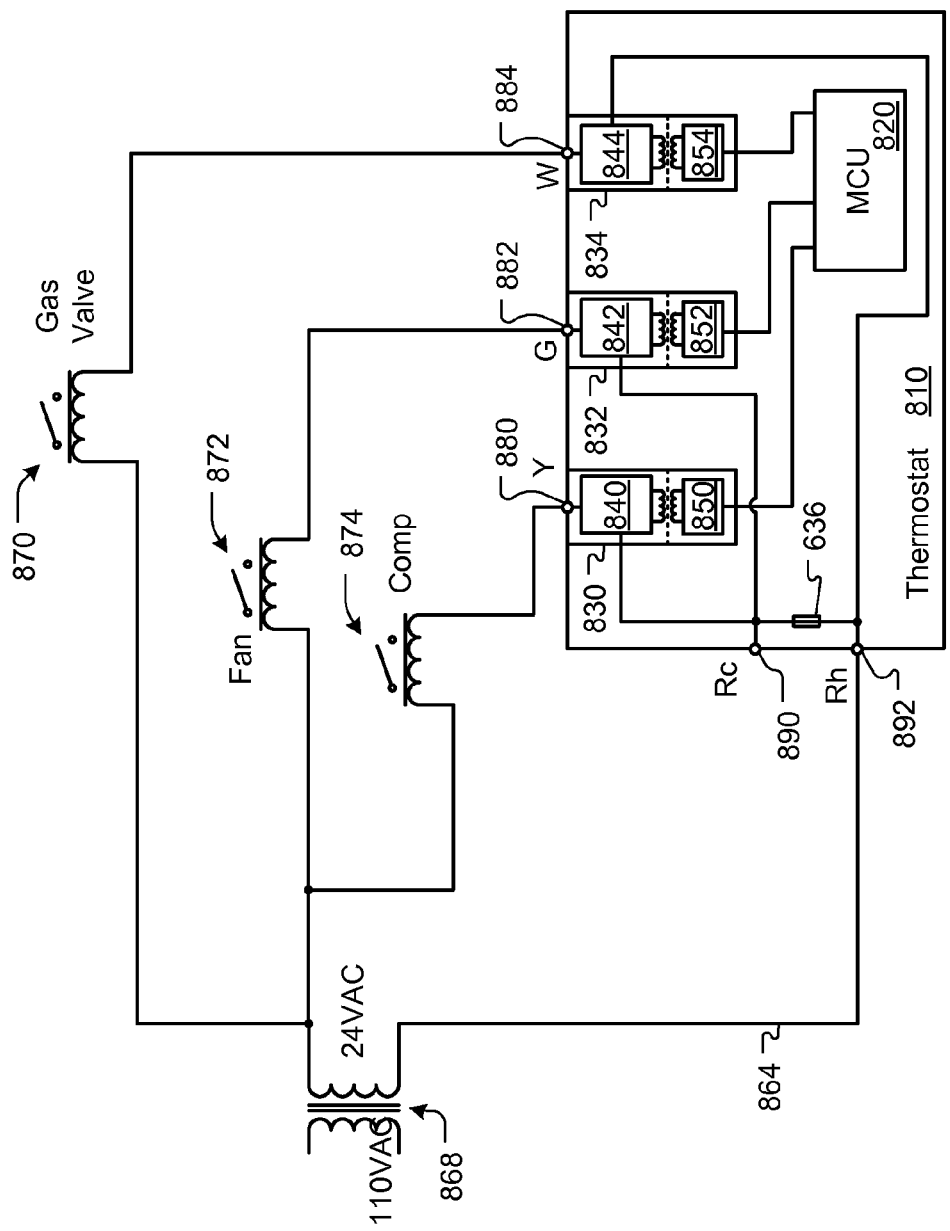

FIGS. 8A-8B are simplified schematic diagrams illustrating a jumperless thermostat connected to two different HVAC systems, respectively according to some embodiments. FIG. 8A shows jumperless thermostat 810 wired for control to an HVAC system having two power transformers 860 and 862. As discussed elsewhere herein, a two-transformer HVAC system is commonly found in residences and light commercial buildings in which an existing heating system was subsequently upgraded or has had an air conditioning system installed. Heat power transformer 860 converts 110 volt AC power to 24 volt AC power for the heating control circuit 864. Similarly, cooling power transformer 862 converts 110 volt AC power to 24 volt AC power for the cooling control circuit 866. Note that the 110 or 24 volt levels described above could be different in different systems, depending on the location of the building and/or the types of power that is available. For example, the 110 volt power could be replaced by 220 or 240 volts in some geographic locations.

Relay 870 controls the gas valve for the HVAC heating system. When sufficient AC current flows through the gas valve relay 870, gas in the heating system is activated. The gas valve relay 870 connected via a wire to terminal 884, which is labeled the "W" terminal, on thermostat 810. Relay 872 controls the fan for the HVAC heating and cooling systems. When sufficient AC current flows through the fan relay 872, the fan is activated. The fan relay 872 connected via a wire to terminal 882, which is labeled the "G" terminal on thermostat 810. Contactor (or relay) 874 controls the compressor for the HVAC cooling system. When sufficient AC current flows through the compressor contactor 874, the fan is activated. The contactor 874 connected via a wire to terminal 880, which is labeled the "Y" terminal, on thermostat 810. The heat power transformer 860 is connected to thermostat 810 via a wire to terminal 892, which is labeled the "Rh" terminal.

The cooling power transformer 862 is connected to thermostat 810 via a wire to terminal 890, which is labeled the "Rc" terminal.

Thermostat 810 includes three isolated FET drives 830, 832, and 834 for switching open and close the AC current to each of the relays 870, 872, and 874. Note that according to some embodiments, each of the FET drives 830, 832, and 834 are of the design of sub-circuit 700 as shown and described with respect to FIG. 7, and also correspond to the isolated FET drives 310 in FIG. 3B. Although only three isolated FET drives are shown in FIGS. 8A-8B, according to some embodiments other numbers of isolated FET drives are provided depending on the number of expected controllable components in the HVAC system where the thermostat is intended to be installed. For example, according to some embodiments, 5 to 10 isolated FET drives can be provided.

Drive 830 includes a switching portion 840 for opening and closing the AC current between terminal 880 and terminal 890, thereby controlling the compressor contactor 874 of the HVAC cooling system. The drive portion 840 is controlled by and isolated from, via a transformer, driver circuit 850. The MCU 820 controls driver circuit 850. Drive 832 includes a switching portion 842 for opening and closing the AC current between terminal 882 and terminal 890, thereby controlling the fan relay 872 of the HVAC heating and cooling systems. The drive portion 842 is controlled and isolated from, via a transformer, driver circuit 852. The MCU 820 controls driver circuit 852. Drive 834 includes a switching portion 844 for opening and closing the AC current between terminal 884 and terminal 892, thereby controlling the gas valve relay 870 of the HVAC system. The drive portion 844 is controlled by and isolated from, via a transformer, driver circuit 854. The MCU 820 controls driver circuit 854. Note that although the drive portions 840, 842, and 844 are isolated from the driver circuits 850, 852, and 854 respectively by a transformer, other isolation means could be provided as described with respect to FIG. 7. Note that due to the design of thermostat 810, the terminals 890 and 892 (i.e. the Rc and Rh terminals) are permanently shorted without the use of a removable jumper. According to some embodiments, a safety fuse 836 is provided.

FIG. 8B shows jumperless thermostat 810 wired for control to an HVAC system having a single power transformer 868 that converts 110 volt AC power to 24 volt AC power for the control circuit 864. In this case, relays 872 and 874, which control the fan and the compressor, respectively, are both attached to transformer 868. Power transformer 868 is connected to thermostat 810 via a wire to terminal 892, which is labeled the "Rh" terminal. Note that since thermostat 810 is designed with a short between terminals 890 and 892, the power transformer 868 could alternatively be connected to thermostat 810 via a wire to terminal 890 (the Rc terminal). Additionally, no jumper needs to be installed or removed by a user or installer when using thermostat 810 with either a one transformer HVAC system as shown in FIG. 8B or a two transformer HVAC system as shown in FIG. 8A. However, in cases where the thermostat is connected to two transformers via terminals 890 and 892, depending on the relative phases of the power circuits, voltages of 48 to 54 VAC can generate voltages as high as about 80 volts within the thermostat, and therefore the components drive portions 840, 842, and 844 should be designed accordingly. For example, according to some embodiments, when thermostat 810 is designed with a short between terminals 890 and 682 as shown in FIGS. 8A and 8B, the exposed components are designed such that up to 100 volts can be tolerated. According to some embodiments, other designs, such as shown below in FIGS. 9A-9B and 10A-10B, can be used to avoid relatively high peak voltages as described.

Figure 9A:
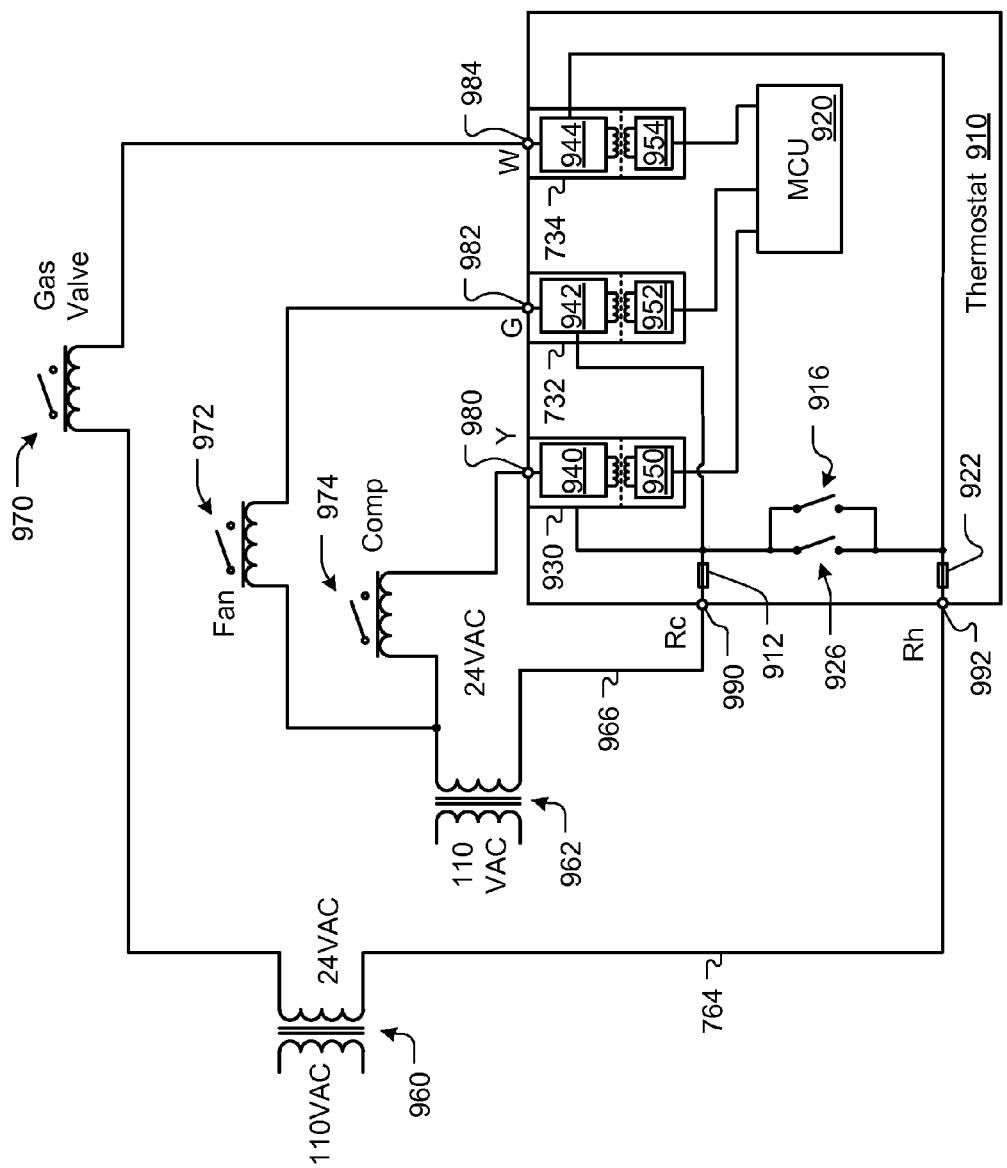
FIGS. 9A-9B are simplified schematic diagrams illustrating a jumperless thermostat connected to two different HVAC systems, respectively according to some embodiments.
Figure 9B:
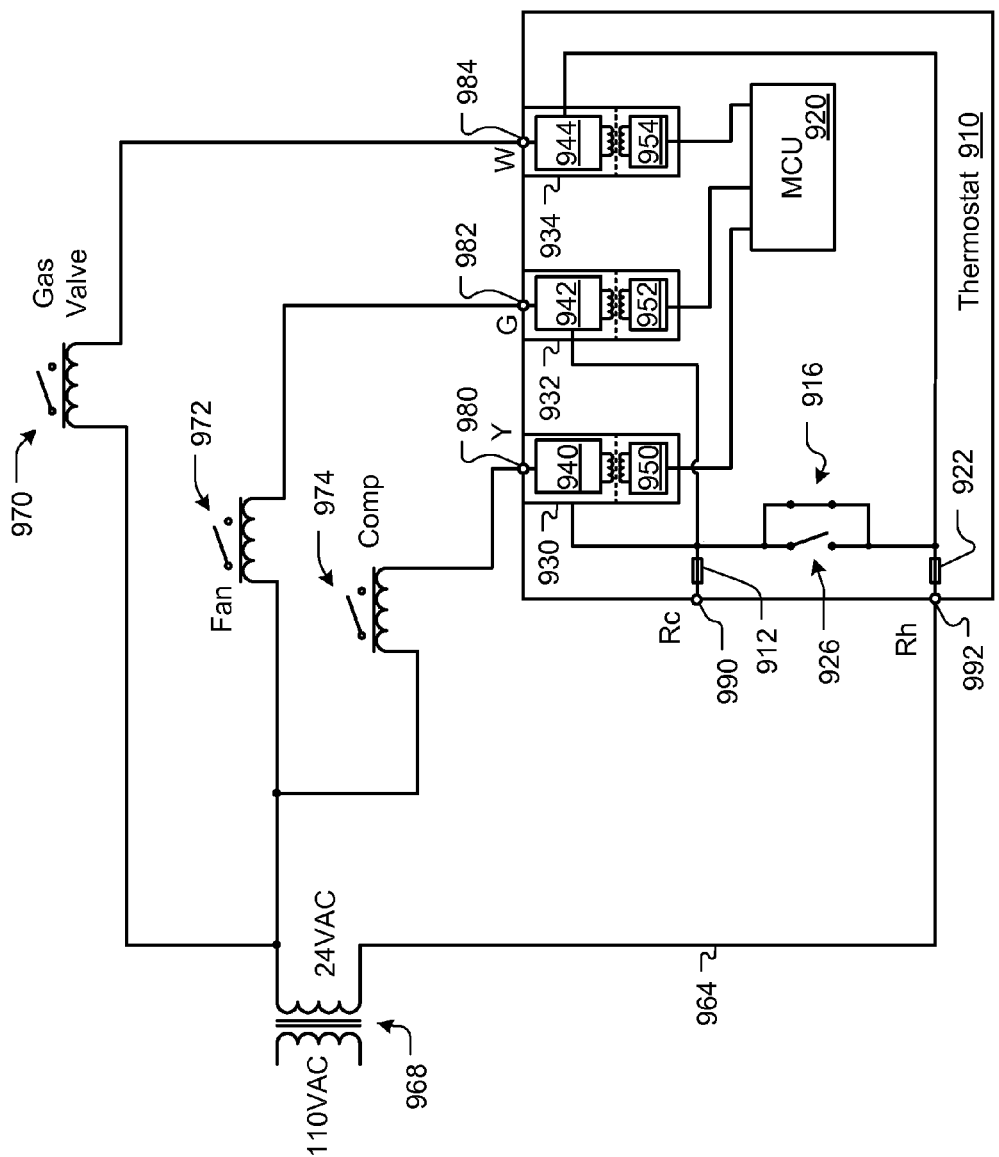

FIGS. 9A-9B are simplified schematic diagrams illustrating a jumperless thermostat connected to two different HVAC systems, respectively according to some embodiments. FIG. 9A shows jumperless thermostat 910 wired for control to an HVAC system having two power transformers 960 and 962. As discussed elsewhere herein, a two-transformer HVAC system is commonly found in residences and light commercial building in which an existing heating system was subsequently upgraded or had had an air conditioning system installed. Heat power transformer 960 converts 110 volt AC power to 24 volt AC power for the heating control circuit 964. Similarly, cooling power transformer 962 converts 110 volt AC power to 24 volt AC power for the cooling control circuit 966. Note that the 110 or 24 volt levels could be different, depending on the location of the building and/or what types of power is available. For example, the 110 volts could be 220 or 240 volts in some geographic locations.

Relay 970 controls the gas valve for the HVAC heating system. When sufficient AC current flows through the gas valve relay 970, gas in the heating system is activated. The gas valve relay 970 connected via a wire to terminal 784, which is labeled the "W" terminal, on thermostat 910. Relay 972 controls the fan for the HVAC heating and cooling systems. When sufficient AC current flows through the fan relay 972, the fan is activated. The fan relay 972 connected via a wire to terminal 982, which is labeled the "G" terminal on thermostat 910. Contactor (or relay) 974 controls the compressor for the HVAC cooling system. When sufficient AC current flows through the compressor contactor 974, the fan is activated. The contactor 974 connected via a wire to terminal 980, which is labeled the "Y" terminal, on thermostat 910. The heat power transformer 960 is connected to thermostat 910 via a wire to terminal 992, which is labeled the "Rh" terminal. The cooling power transformer 962 is connected to thermostat 910 via a wire to terminal 990, which is labeled the "Rc" terminal.

Thermostat 910 includes three isolated FET drives 930, 932, and 934 for switching open and close the AC current to each of the relays 970, 972, and 974. Note that according to some embodiments, each of the FET drives 930, 932, and 934 are of the design of sub-circuit 700 as shown and described with respect to FIG. 7, and also correspond to the isolated FET drives 310 in FIG. 3B. Although only three isolated FET drives are shown in FIGS. 9A-9B, according to some embodiments other numbers of isolated FET drives are provided depending on the number of expected controllable components in the HVAC system where the thermostat is intended to be installed. For example, according to some embodiments, 5 to 10 isolated FET drives can be provided.

Drive 930 includes a switching portion 940 for opening and closing the AC current between terminal 980 and terminal 990, thereby controlling the compressor contactor 974 of the HVAC cooling system. The switching portion 940 is controlled by and isolated from, via a transformer, driver circuit 950. The MCU 920 controls driver circuit 950. Drive 932 includes a switching portion 942 for opening and closing the AC current between terminal 982 and terminal 990, thereby controlling the fan relay 972 of the HVAC heating and cooling systems. The drive portion 942 is controlled and isolated from, via a transformer, driver circuit 952. The MCU 920 controls driver circuit 952. Drive 934 includes a switching portion 944 for opening and closing the AC current between terminal 984 and terminal 992, thereby controlling the gas valve relay 970 of the HVAC system. The drive portion 944 is controlled by and isolated from, via a transformer, driver circuit 954. The MCU 920 controls driver circuit 954. Note that although the drive portions 940, 942 and 944 are isolated from the driver circuits 950, 952, and 950 respectively by a transformer, other isolation means could be provided as described with respect to FIG. 7.

Two normally-closed switches 916 and 926 are provided between the Rc terminal 990 and the Rh terminal 992. Switch 916 is automatically opened when the presence of a wire connected to the Rc terminal 990 is detected, and switch 926 is opened automatically when the presence of a wire connected to Rh terminal 992 is detected. According to some embodiments, the switches 916 and 926 are provided using a connector as described in co-pending U.S. patent application Ser. No. 13/034,666 entitled "Thermostat Wiring Connector," filed Feb. 24, 2011 and incorporated herein by reference. In particular, switches 926 and 916 can correspond to the switched pairs of secondary conductors 750 in FIG. 7C and 746 in FIG. 7D in that co-pending patent application. Since, in the case shown in FIG. 9A there are wires connected to both Rc and Rh terminals 990 and 992, both switches 916 and 926 are opened and the Rc and Rh terminals 990 and 992 are not electrically connected to each other. Two fuses, 912 and 922 can also be provided for added safety.

FIG. 9B shows jumperless thermostat 910 wired for control to an HVAC system having a single power transformer 968 that converts 110 volt AC power to 24 volt AC power for the control circuit 764. In this case, relays 972 and 974, which control the fan and the compressor, respectively, are both attached to transformer 968. The power transformer 968 is connected to thermostat 910 via a wire to the Rh terminal 992. Since a wire is connected to Rh terminal 992, the switch 926 is open, and since no wire is connected to Rc terminal 990, the switch 916 is closed. Thus an electrical connection exists between the Rc and Rh terminals 990 and 992 as all of the circuitry in thermostat 910 that would be connected to the Rc terminal, such as drives 730 and 932 are connected to the Rh terminal. Note that a similar configuration would result if the user attaches the wire 964 into the Rc terminal 990 instead of the Rh terminal 992. In that case, switch 916 could be closed, but switch 926 would be open.

Figure 10A:
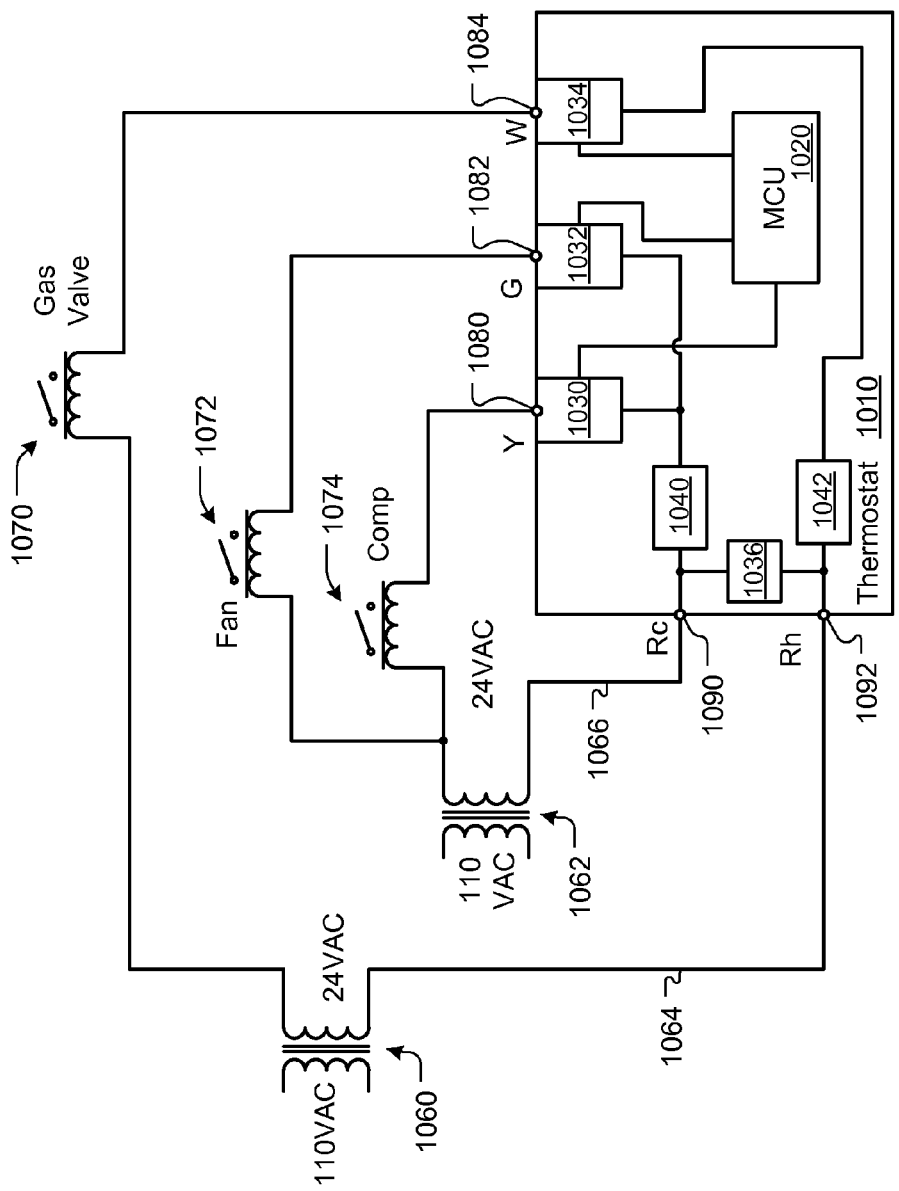
FIGS. 10A-10B are simplified schematic diagrams illustrating a jumperless thermostat connected to two different HVAC systems, respectively according to some alternate embodiments.
Figure 10B:
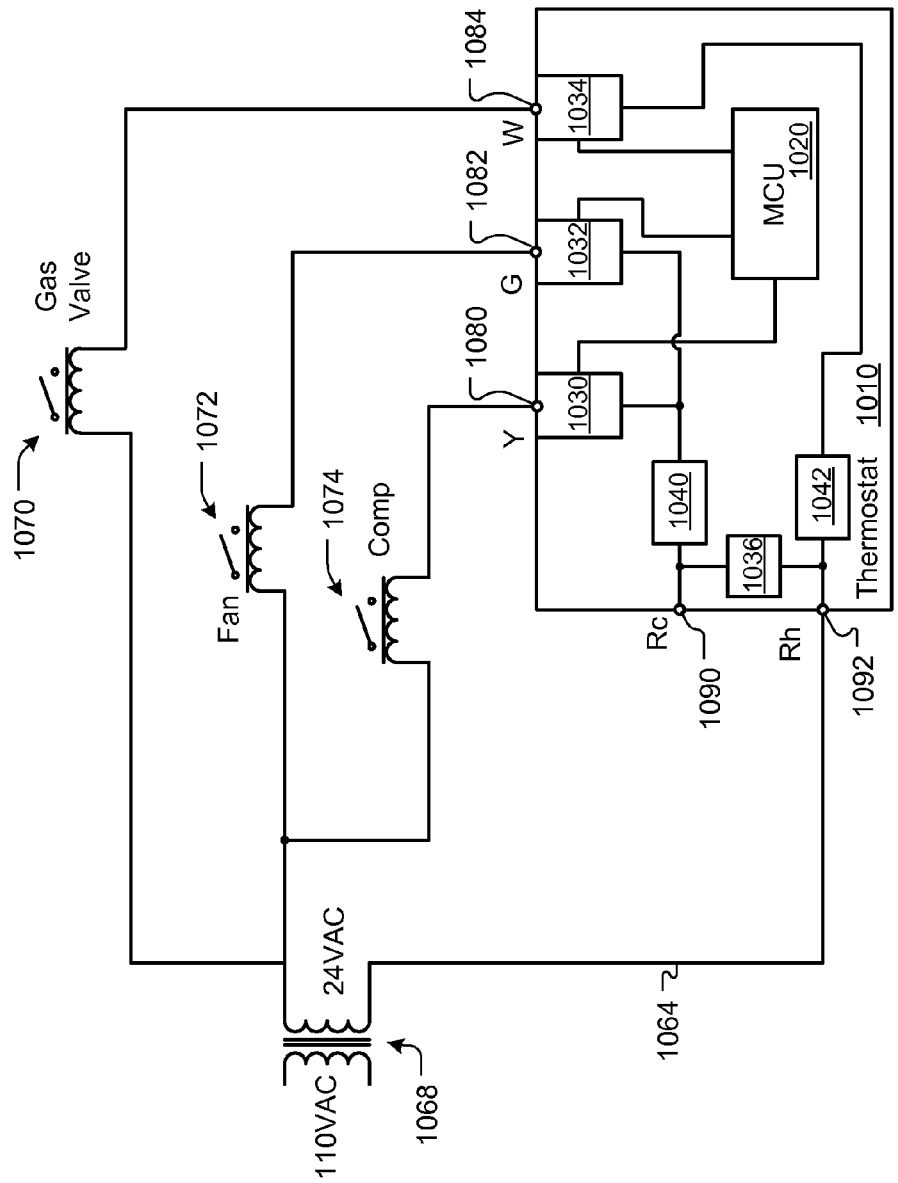

FIGS. 10A-10B are simplified schematic diagrams illustrating a jumperless thermostat connected to two different HVAC systems, respectively according to some alternate embodiments. FIG. 10A shows jumperless thermostat 1010 wired for control to an HVAC system having two power transformers 1060 and 1062. As discussed elsewhere herein, a two-transformer HVAC system is commonly found in residences and light commercial building in which an existing heating system was subsequently upgraded or had had an air conditioning system installed. Heat power transformer 1060 converts 110 volt AC power to 24 volt AC power for the heating control circuit 864. Similarly, cooling power transformer 1062 converts 110 volt AC power to 24 volt AC power for the cooling control circuit 1066. Note that the 110 or 24 volt levels could be different, depending on the location of the building and/or what types of power is available. For example, the 110 volts could be 220 or 240 volts in some geographic locations.

Relay 1070 controls the gas valve for the HVAC heating system. When sufficient AC current flows through the gas valve relay 1070, gas in the heating system is activated. The gas valve relay 1070 connected via a wire to terminal 884, which is labeled the "W" terminal, on thermostat 1010. Relay 1072 controls the fan for the HVAC heating and cooling systems. When sufficient AC current flows through the fan relay 1072, the fan is activated. The fan relay 1072 connected via a wire to terminal 1082, which is labeled the "G" terminal on thermostat 1010. Contactor (or relay) 1074 controls the compressor for the HVAC cooling system. When sufficient AC current flows through the compressor contactor 1074, the fan is activated. The contactor 1074 connected via a wire to terminal 1080, which is labeled the "Y" terminal, on thermostat 1010. The heat power transformer 1060 is connected to thermostat 1010 via a wire to terminal 1092, which is labeled the "Rh" terminal. The cooling power transformer 1062 is connected to thermostat 1010 via a wire to terminal 1090, which is labeled the "Rc" terminal.

Thermostat 1010 includes switching circuits 1030, 1032, and 1034 for switching open and close the AC current to each of the relays 1070, 1072 and 1074 under the control of MCU 1020. According to some embodiments, the circuits 1030, 1032 and 1034 could be relays.

According to other embodiments, switching circuits 1030, 1032 and 1034 could be implemented using isolated FET drives such as shown in FIGS. 8A-B and 9A-B. Although only three switching circuits are shown in FIGS. 10A-B, according to some embodiments other numbers of switching circuits are provided depending on the number of expected controllable components in the HVAC system where the thermostat is intended to be installed. For example, according to some embodiments, 5 to 10 switching circuits can be provided.

According to some embodiments, thermostat 1010 includes two auto detection circuits 1040 and 1042 to detect whether an AC signal is being applied to terminals 1090 and 1092 respectively. According some embodiments, a half-bridge sense circuit such as shown and described with respect to FIG. 5, is used for each of the auto detection circuits 1040 and 1042. As described above in connection with FIG. 5, the sense outputs of auto detection circuits 1040 and 1042 are connected to the microcontroller 1020 so that microcontroller 1020 can sense the presence of a signal on the HVAC lines. Also provided is a switching circuit 1036 for opening and closing a connection between the terminals 1090 and 1092 depending on whether the thermostat 1010 is installed with an HVAC system having one or two power transformers. Switching circuit 1036 can be implemented using a relay, but solid state switching such as using FETs could be used according to some embodiments. In some embodiments, switching circuit 1036 is controlled by microcontroller 1020.

FIG. 10B shows jumperless thermostat 1010 wired for control to an HVAC system having a single power transformer 1068. In this case, relays 1072 and 1074, which control the fan and the compressor, respectively, are both attached to transformer 1068. The power transformer 868 is connected to thermostat 1010 via a wire to terminal 1092, which is labeled the "Rh" terminal. Auto detection using 1040 and 1042 is carried out while the switching circuit 1036 is open. If AC signals are detected on both terminals 1090 and 1092, then it is assumed that there are two separate HVAC power transformers, such as shown in FIG. 10A. Accordingly the switching circuit 1036 is left open. If AC signals are detected on only one of the terminals 1090 and 1092, then it is assumed that there is only a single HVAC power transformer such as shown in FIG. 10B. Accordingly the switching circuit 1036 is closed. Additionally, no jumper needs to be manually installed or removed when using thermostat 1010 with either a one transformer HVAC system as shown in FIG. 10B or a two transformer HVAC system as shown in FIG. 10A. By providing an auto-detection capability, the thermostat 1010 advantageously does not need to query so as to be easier to install and avoids problems associated with user errors.

According to some embodiments, user input can be used to control switching circuit 1036 instead of, or in addition to using auto detection circuits 1040 and 1042. According to such embodiments, user input is provided via a user interface such as button on the head unit of thermostat 1010 (not shown), and in response, the MCU 1020 opens or closes the switching circuit 1036. For example, during installation, a user or installer may be queried whether the HVAC system has one or two power transformers. If the user indicates there are two HVAC power transformers than the switching circuit 1036 is opened and if the user indicates there is only one HVAC power transformer then switching circuit 1036 is closed.

Figure 11:
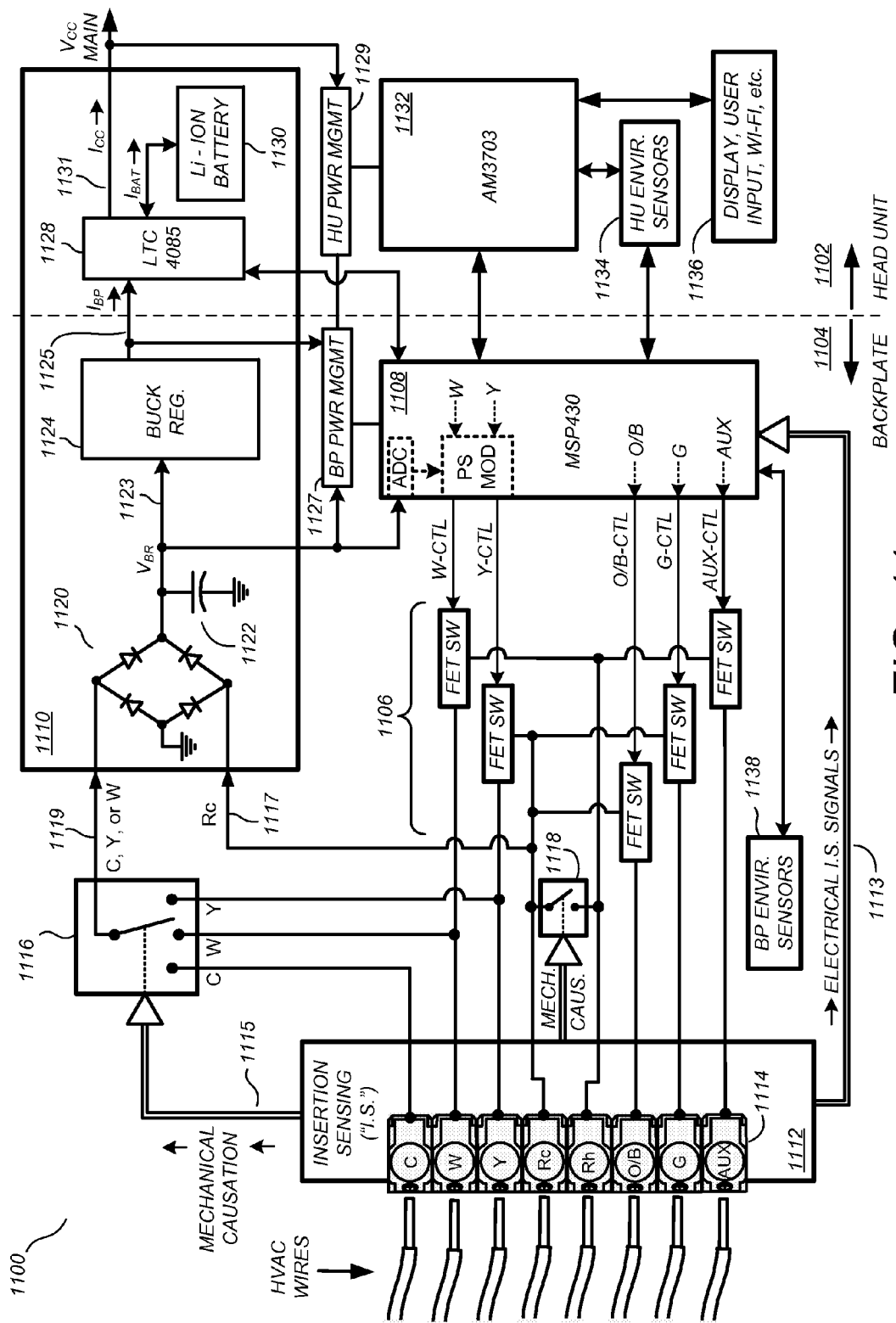
FIG. 11 illustrates a thermostat according to a preferred embodiment.

FIG. 11 illustrates a thermostat 1100 according to a preferred embodiment, the thermostat 1100 comprising selected feature combinations that have been found to be particularly advantageous for the facilitation of do-it-yourself thermostat installation, the accommodation of a variety of different practical installation scenarios (including scenarios where a "C" power wire is not available), the provisioning of relatively power-intensive advanced interfaces and functionalities (e.g., a large visually pleasing electronic display, a relatively powerful general purpose microprocessor, and a reliable Wi-Fi communications chip) even where a "C" power wire is not available, the facilitation of operational robustness and durability, compact device size, quietness of operation, and other advantageous characteristics described in the instant disclosure and/or the commonly assigned incorporated applications. In the discussion that follows, the following HVAC wiring shorthand notations are used: W (heat call relay wire); Y (cooling call relay wire); Rh (heat call relay power); Rc (cooling call relay power); G (fan call relay wire); O/B (heat pump call relay wire); AUX (auxiliary call relay wire); and C (common wire).

The Rh wire, which leads to one side of the HVAC power transformer (or simply "HVAC transformer") that is associated with a heating call relay, can go by different names in the art, which can include heating call switch power wire, heat call power return wire, heat return wire, return wire for heating, or return for heating. The Rc wire, which leads to one side of the HVAC transformer that is associated with a cooling call relay, can likewise go by different names including cooling call switch power wire, cooling call power return wire, cooling return wire, return wire for cooling, or return for cooling. In the case of single-HVAC-transformer systems having both heating and cooling functions, it is one and the same HVAC power transformer that is associated with both the heating call relay and cooling call relay, and in such cases there is just a single wire, usually labeled "R", leading back to one side of that HVAC transformer, which likewise can go by different names in the art including call switch power wire, call relay power wire, call power return wire, power return wire, or simply return wire.

As illustrated generally in FIG. 11, the thermostat 1100 comprises a head unit 1102 and a backplate 1104. The backplate 1104 comprises a plurality of FET switches 1106 used for carrying out the essential thermostat operations of connecting or "shorting" one or more selected pairs of HVAC wires together according to the desired HVAC operation. The details of FET switches 1106, each of which comprises a dual back-to-back FET configuration, can be found elsewhere in the instant disclosure and/or in the commonly assigned U.S. Ser. No. 13/034,674, supra. The operation of each of the FET switches 1106 is controlled by a backplate microcontroller 1108 which can comprise, for example, an MSP430 16-bit ultra-low power RISC mixed-signal microprocessor available from Texas Instruments.

Thermostat 1100 further comprises powering circuitry 1110 that comprises components contained on both the backplate 1104 and head unit 1102. Generally speaking, it is the purpose of powering circuitry 1110 to extract electrical operating power from the HVAC wires and convert that power into a usable form for the many electrically-driven components of the thermostat 1100. Thermostat 1100 further comprises insertion sensing components 1112 configured to provide automated mechanical and electrical sensing regarding the HVAC wires that are inserted into the thermostat 1100. Thermostat 1100 further comprises a relatively high-power head unit microprocessor 1132, such as an AM3703 Sitara ARM microprocessor available from Texas Instruments, that provides the main general governance of the operation of the thermostat 1100. Thermostat 1100 further comprises head unit/backplate environmental sensors 1134/1138 (e.g., temperature sensors, humidity sensors, active IR motion sensors, passive IR motion sensors, ambient visible light sensors, accelerometers, ambient sound sensors, ultrasonic/infrasonic sound sensors, etc.), as well as other components 1136 (e.g., electronic display devices and circuitry, user interface devices and circuitry, wired communications circuitry, wireless communications circuitry such as Wi-Fi and/or ZigBee chips) that are operatively coupled to the head unit microprocessor 1132 and/or backplate microprocessor 1108 and collectively configured to provide the functionalities described in the instant disclosure and/or the commonly assigned incorporated applications.

The insertion sensing components 1112 include a plurality of HVAC wiring connectors 1114, each containing an internal springable mechanical assembly that, responsive to the mechanical insertion of a physical wire thereinto, will mechanically cause an opening or closing of one or more dedicated electrical switches associated therewith. Exemplary configurations for each of the HVAC wiring connectors 1114 can be found in the commonly assigned U.S. Ser. No. 13/034,666, supra. With respect to the HVAC wiring connectors 1114 that are dedicated to the C, W, Y, Rc, and Rh terminals, those dedicated electrical switches are, in turn, networked together in a manner that yields the results that are illustrated in FIG. 11 by the blocks 1116 and 1118. For clarity of presentation in FIG. 11, the block 1116 is shown as being coupled to the internal sensing components 1112 by virtue of double lines termed "mechanical causation," for the purpose of denoting that the output of block 1116 is dictated solely by virtue of the particular combination of HVAC wiring connectors 1114 into which wires have been mechanically inserted. More specifically, the output of block 1116, which is provided at a node 1119, is dictated solely by virtue of the particular combination of C, W, and Y connectors into which wires have been mechanically inserted. Still more specifically, the output of block 1116 at node 1119 is provided in accordance with the following rules: if a wire is inserted into the C connector, then the node 1119 becomes the C node regardless of whether there are any wires inserted into the Y or W connectors; if no wire is inserted into the C connector and a wire is inserted into the Y connector, then the node 1119 becomes the Y node regardless of whether there is a wire inserted into the W connector; and if no wire is inserted into either of the C or Y connectors, then the node 1119 becomes the W node. Exemplary configurations for achieving the functionality of block 1116 (as combined with components 1112 and wiring connectors 1114) can be found elsewhere in the instant disclosure and/or in the commonly assigned U.S. Ser. No. 13/034,678, supra. It is to be appreciated that, although mechanical causation for achieving the functionality of block 1116 (as combined with components 1112 and wiring connectors 1114) has been found to be particularly advantageous for simplicity and do-it-yourself ("DIY") foolproofing, in other embodiments there can be similar functionalities carried out electrically, magnetically, optically, electro-optically, electro-mechanically, etc. without departing from the scope of the present teachings. Thus, for example, similar results could be obtained by using optically, electrically, and/or magnetically triggered wire insertion sensing components that are coupled to relays or electronic switches that carry out the functionality of block 1116 (as combined with components 1112 and wiring connectors 1114) without departing from the scope of the present teachings.

Likewise, for clarity of presentation in FIG. 11, the block 1118 is also shown as being coupled to the internal sensing components 1112 by virtue of double lines termed "mechanical causation," for the purpose of denoting that its operation, which is either to short the Rc and Rh nodes together or not to short the Rc and Rh nodes together, is dictated solely by virtue of the particular combination of HVAC wiring connectors 1114 into which wires have been mechanically inserted. More specifically, whether the block 1118 will short, or not short, the Rc and Rh nodes together is dictated solely by virtue of the particular combination of Rc and Rh connectors into which wires have been mechanically inserted. Still more specifically, the block 1118 will keep the Rc and Rh nodes shorted together, unless wires have been inserted into both the Rc and Rh connectors, in which case the block 1118 will not short the Rc and Rh nodes together because a two-HVAC-transformer system is present. Exemplary configurations for achieving the functionality of block 1118 (as combined with components 1112 and wiring connectors 1114) can be found elsewhere in the instant disclosure and/or in the commonly assigned U.S. Ser. No. 13/034,674, supra. It is to be appreciated that, although mechanical causation for achieving the functionality of block 1118 (as combined with components 1112 and wiring connectors 1114) has been found to be particularly advantageous for simplicity and do-it-yourself ("DIY") foolproofing, in other embodiments there can be similar functionalities carried out electrically, magnetically, optically, electro-optically, electro-mechanically, etc., in different combinations, without departing from the scope of the present teachings. Thus, for example, similar results could be obtained by using optically, electrically, and/or magnetically triggered wire insertion sensing components that are coupled to relays or electronic switches that carry out the functionality of block 1118 (as combined with components 1112 and wiring connectors 1114) without departing from the scope of the present teachings.

As illustrated in FIG. 11, the insertion sensing circuitry 1112 is also configured to provide electrical insertion sensing signals 1113 to other components of the thermostat 1100, such as the backplate microcontroller 1108. Preferably, for each of the respective HVAC wiring terminal 1114, there is provided at least two signals in electrical form to the microcontroller 1108, the first being a simple "open" or "short" signal that corresponds to the mechanical insertion of a wire, and the second being a voltage or other level signal (in analog form or, optionally, in digitized form) that represents a sensed electrical signal at that terminal (as measured, for example, between that terminal and an internal thermostat ground node). Exemplary configurations for providing the sensed voltage signal can be found elsewhere in the instant disclosure and/or in the commonly assigned U.S. Ser. No. 13/034, 674, supra. The first and second electrical signals for each of the respective wiring terminals can advantageously be used as a basis for basic "sanity checking" to help detect and avoid erroneous wiring conditions. For example, if there has been a wire inserted into the "C" connector, then there should be a corresponding voltage level signal sensed at the "C" terminal, and if that corresponding voltage level signal is not present or is too low, then an error condition is indicated because there should always be a voltage coming from one side of the HVAC power transformer (assuming that HVAC system power is on, of course). As another example, if there has been a wire inserted into the "O/B" connector (heat pump call relay wire) but no wire has been inserted into the "Y" connector (cooling call relay wire), then an error condition is indicated because both of these wires are needed for proper heat pump control. Exemplary ways for conveying proper and/or improper wiring status information to the user can be found elsewhere in the instant disclosure and/or in the commonly assigned U.S. Ser. No. 13/269,501, supra.

Basic operation of each of the FET switches 1106 is achieved by virtue of a respective control signal (OFF or ON) provided by the backplate microcontroller 1108 that causes the corresponding FET switch 1106 to "connect" or "short" its respective HVAC lead inputs for an ON control signal, and that causes the corresponding FET switch 1106 to "disconnect" or "leave open" or "open up" its respective HVAC lead inputs for an OFF control signal. For example, the W-Rh FET switch keeps the W and Rh leads disconnected from each other unless there is an active heating call, in which case the W-Rh FET switch shorts the W and Rh leads together. As a further example, the Y-Rc FET switch keeps the Y and Rc leads disconnected from each other unless there is an active cooling call, in which case the Y-Rc FET switch shorts the Y and Rc leads together. (There is one exception to this basic operation for the particular case of "active power stealing" that is discussed in more detail infra, in which case the FET switch corresponding to the HVAC lead from which power is being stolen is opened up for very brief intervals during an active call involving that lead. Thus, if power-stealing is being performed using the Y lead, then during an active cooling call the Y-Rc FET switch is opened up for very brief intervals from time to time, these brief intervals being short enough such that the Y HVAC relay does not un-trip.)

Advantageously, by virtue of the above-described operation of block 1118, it is automatically the case that for single-transformer systems having only an "R" wire (rather than separate Rc and Rh wires as would be present for two-transformer systems), that "R" wire can be inserted into either of the Rc or Rh terminals, and the Rh-Rc nodes will be automatically shorted to form a single "R" node, as needed for proper operation. In contrast, for dual-transformer systems, the insertion of two separate wires into the respective Rc and Rh terminals will cause the Rh-Rc nodes to remain disconnected to maintain two separate Rc and Rh nodes, as needed for proper operation. The G-Rc FET switch keeps the G and Rc leads disconnected from each other unless there is an active fan call, in which case the G-Rc FET switch shorts the G and Rc leads together (and, advantageously, the proper connection will be achieved regardless of whether the there is a single HVAC transformer or dual HVAC transformers because the Rc and Rh terminals will be automatically shorted or isolated accordingly). The AUX-Rh FET switch keeps the AUX and Rh leads disconnected from each other unless there is an active AUX call, in which case the AUX-Rh FET switch shorts the AUX and Rh leads together (and, advantageously, the proper connection will be achieved regardless of whether the there is a single HVAC transformer or dual HVAC transformers because the Rc and Rh terminals will be automatically shorted or isolated accordingly). For heat pump calls, the O/B-Rc FET switch and Y-Rc FET switch are jointly operated according to the required installation-dependent convention for forward or reverse operation (for cooling or heating, respectively), which convention can advantageously be determined automatically (or semi-automatically using feedback from the user) by the thermostat 1100 as described further in the commonly assigned PCT/US12/30084, supra.

Referring now to the powering circuitry 1110 in FIG. 11, advantageously provided is a configuration that automatically adapts to the powering situation presented to the thermostat 1100 at the time of installation and thereafter in a manner that has been found to provide a good combination of robustness, adaptability, and foolproofness. The powering circuitry 1110 comprises a full-wave bridge rectifier 1120, a storage and waveform-smoothing bridge output capacitor 1122 (which can be, for example, on the order of 30 microfarads), a buck regulator circuit 1124, a power-and-battery (PAB) regulation circuit 1128, and a rechargeable lithium-ion battery 1130. In conjunction with other control circuitry including backplate power management circuitry 1127, head unit power management circuitry 1129, and the microcontroller 1108, the powering circuitry 1110 is configured and adapted to have the characteristics and functionality described hereinbelow. Description of further details of the powering circuitry 1110 and associated components can be found elsewhere in the instant disclosure and/or in the commonly assigned U.S. Ser. No. 13/034,678, supra, and U.S. Ser. No. 13/267,871, supra.

By virtue of the configuration illustrated in FIG. 11, when there is a "C" wire presented upon installation, the powering circuitry 1110 operates as a relatively high-powered, rechargeable-battery-assisted AC-to-DC converting power supply. When there is not a "C" wire presented, the powering circuitry 1110 operates as a power-stealing, rechargeable-battery-assisted AC-to-DC converting power supply. As illustrated in FIG. 11, the powering circuitry 1110 generally serves to provide the voltage Vcc MAIN that is used by the various electrical components of the thermostat 1100, and that in one embodiment will usually be about 4.0 volts. As used herein, "thermostat electrical power load" refers to the power that is being consumed by the various electrical components of the thermostat 1100. Thus, the general purpose of powering circuitry 1110 is to judiciously convert the 24 VAC presented between the input leads 1119 and 1117 to a steady 4.0 VDC output at the Vcc MAIN node to supply the thermostat electrical power load. Details relating to bootstrap circuitry (not shown), whose purpose is to provide a kind of cruder, less well-regulated, lower-level electrical power that assists in device start-up and that can act as a kind of short term safety net, are omitted from the present discussion for purposes of clarity of description, although further information on such circuitry can be found in U.S. Ser. No. 13/034,678, supra.

Operation of the powering circuitry 1110 for the case in which the "C" wire is present is now described. Although the powering circuitry 1110 may be referenced as a "power-stealing" circuit in the general sense of the term, the mode of operation for the case in which the "C" wire is present does not constitute "power stealing" per se, because there is no power being "stolen" from a wire that leads to an HVAC call relay coil (or to the electronic equivalent of an HVAC call relay coil for some newer HVAC systems). For the case in which the "C" wire is present, there is no need to worry about accidentally tripping (for inactive power stealing) or untripping (for active power stealing) an HVAC call relay, and therefore relatively large amounts of power can be assumed to be available from the input at nodes 1119/1117. When the 24 VAC input voltage between nodes 1119 and 1117 is rectified by the full-wave bridge rectifier 1120, a DC voltage at node 1123 is present across the bridge output capacitor 1122, and this DC voltage is converted by the buck regulator 1124 to a relatively steady voltage, such as 4.45 volts, at node 1125, which provides an input current $I_{BP}$ to the power-and-battery (PAB) regulation circuit 1128.

The microcontroller 1108 controls the operation of the powering circuitry 1110 at least by virtue of control leads leading between the microcontroller 1108 and the PAB regulation circuit 1128, which for one embodiment can include an LTC4085-3 chip available from Linear Technologies Corporation. The LTC4085-3 is a USB power manager and Li-Ion/Polymer battery charger originally designed for portable battery-powered applications. The PAB regulation circuit 1128 provides the ability for the microcontroller 1108 to specify a maximum value $I_{BP}(max)$ for the input current $I_{BP}$. The PAB regulation circuit 1128 is configured to keep the input current at or below $I_{BP}(max)$, while also providing a steady output voltage Vcc, such as 4.0 volts, while also providing an output current Icc that is sufficient to satisfy the thermostat electrical power load, while also tending to the charging of the rechargeable battery 1130 as needed when excess power is available, and while also tending to the proper discharging of the rechargeable battery 1130 as needed when additional power (beyond what can be provided at the maximum input current $I_{BP}(max)$) is needed to satisfy the thermostat electrical power load. If it is assumed for the sake of clarity of explanation that the voltages at the respective input, output, and battery nodes of the PAB regulation circuit 1128 are roughly equal, the functional operation of the PAB regulation circuit 1128 can be summarized by relationship $I_{BP}=Icc+I_{BAT}$, where it is the function of the PAB regulation circuit 1128 to ensure that $I_{BP}$ remains below $I_{BP}(max)$ at all times, while providing the necessary load current Icc at the required output voltage Vcc even for cases in which Icc is greater than $I_{BP}(max)$. The PAB regulation circuit 1128 is configured to achieve this goal by regulating the value of $I_{BAT}$ to charge the rechargeable battery 1130 ($I_{BAT}>0$) when such charge is needed and when Icc is less than $I_{BP}(max)$, and by regulating the value of $I_{BAT}$ to discharge the rechargeable battery 1130 ($I_{BAT}<0$) when Icc is greater than $I_{BP}(max)$.

For one embodiment, for the case in which the "C" wire is present, the value of $I_{BP}(max)$ for the PAB regulation circuit 1128 is set to a relatively high current value, such as 100 mA, by the microcontroller 1108. Assuming a voltage of about 4.45 volts at node 1125, this corresponds to a maximum output power from the buck regulator 1124 of about 445 mW. Advantageously, by virtue of the rechargeable battery-assisted operation described above, the powering circuitry 1110 can provide instantaneous thermostat electrical power load levels higher than 445 mW on an as-needed basis by discharging the rechargeable battery, and then can recharge the rechargeable battery once the instantaneous thermostat electrical power load goes back down. Generally speaking, depending especially on the instantaneous power usage of the large visually pleasing electronic display (when activated by the user coming close or manipulating the user interface), the high-powered microprocessor 1132 (when not in sleep mode), and the Wi-Fi chip (when transmitting), the instantaneous thermostat electrical power load can indeed rise above 445 mW by up to several hundred additional milliwatts. For preferred embodiments in which the rechargeable battery 1130 has a capacity in the several hundreds of milliamp-hours (mAh) at or near the nominal Vcc voltage levels (e.g., 560 mAh at 3.7 volts), supplying this amount of power is generally not problematic, even for extended time periods (even perhaps up to an hour or more), provided only that there are sufficient periods of lower-power usage below 445 mW in which the rechargeable battery 1130 can be recharged. The thermostat 1100 is configured such that this is easily the case, and indeed is designed such that the average power consumption is below a much lower threshold power than this, as discussed further below in the context of "active power stealing."

Operation of the powering circuitry 1110 for the case in which the "C" wire is not present is now described. For such case, in accordance with the above-described operation of insertion sensing components/switches 1112/1116, it will be the Y-lead that is connected to the node 1119 if a "Y" wire has been inserted, and it will otherwise be the W-lead that is connected to the node 1119 if no "Y" wire has been inserted. Stated differently, it will be the Y-lead from which "power is stolen" if a "Y" wire has been inserted, and it will otherwise be the W-lead from which "power is stolen" if no "Y" wire has been inserted. As used herein, "inactive power stealing" refers to the power stealing that is performed during periods in which there is no active call in place based on the lead from which power is being stolen. Thus, for cases where it is the "Y" lead from which power is stolen, "inactive power stealing" refers to the power stealing that is performed when there is no active cooling call in place. As used herein, "active power stealing" refers to the power stealing that is performed during periods in which there is an active call in place based on the lead from which power is being stolen. Thus, for cases where it is the "Y" lead from which power is stolen, "active power stealing" refers to the power stealing that is performed when there is an active cooling call in place.

Operation of the powering circuitry 1110 for "inactive power stealing" is now described. In the description that follows it will be assumed that the "Y" wire has been inserted and therefore that power is to be stolen from the Y-lead, with it being understood that similar counterpart operation based on the "W" lead applies if no "Y" wire has been inserted and power is to be stolen from the W-lead. During inactive power stealing, power is stolen from between the "Y" wire that appears at node 1119 and the Rc lead that appears at node 1117. As discussed previously, the Rc lead will be automatically shorted to the Rh lead (to form a single "R" lead) for a single-HVAC transformer system, while the Rc lead will be automatically segregated from the Rh lead for a dual-HVAC transformer system. In either case, there will be a 24 VAC HVAC transformer voltage present across nodes 1119/1117 when no cooling call is in place (i.e., when the Y-Rc FET switch is open). For one embodiment, the maximum current $I_{BP}(max)$ is set to a relatively modest value, such as 20 mA, for the case of inactive power stealing. Assuming a voltage of about 4.45 volts at node 1125, this corresponds to a maximum output power from the buck regulator 1124 of about 90 mW. The power level of 90 mW has been found to be a generally "safe" power stealing level for inactive power stealing, where the term "safe" is used to indicate that, at such power level, all or virtually all HVAC cooling call relays that are installed in most residential and commercial HVAC systems will not accidentally trip into an "on" state due to the current following through the cooling call relay coil. During this time period, the PAB regulator 1128 operates to discharge the battery 1130 during any periods of operation in which the instantaneous thermostat electrical power load rises above 90 mW, and to recharge the battery (if needed) when the instantaneous thermostat electrical power load drops below 90 mW. Provided that the rechargeable battery 1130 is selected to have sufficient capacity (such as 560 mAh at 3.7 volts as discussed above), supplying power at above 90 mW (even several hundred milliwatts more) is generally not problematic even for extended time periods (even perhaps up to an hour or more), provided only that there are sufficient periods of lower-power usage below 90 mW in which the rechargeable battery 1130 can be recharged. The thermostat 1100 is configured such that the average power consumption is well below 90 mW, and indeed for some embodiments is even below 10 mW on a long term time average.

According to one embodiment, the powering circuitry 1110 is further monitored and controlled during inactive power stealing by the microcontroller 1108 by virtue of monitoring the voltage $V_{BR}$ across the bridge output capacitor 1122 at node 1123 that leads into the buck regulator 1124. For the embodiment of FIG. 11, the voltage VBR is monitored directly by virtue of an analog to digital converter ("ADC") that is built into the microcontroller 1108. According to an embodiment, the voltage $V_{BR}$ across the bridge output capacitor 1122 can be monitored, either on a one-time basis, a periodic basis, or a continuous basis to assess a general "strength" of the HVAC system with respect to the power that can be safely provided during inactive power stealing. This assessment can then be used to adjust a determination for the maximum "safe" amount of power that can be provided at the output of buck regulator 1124 during inactive power stealing, which can in turn be implemented by the microcontroller 1108 by setting the maximum input current $I_{BP}$(max) of the PAB regulator 1128 for inactive power stealing. In one particularly advantageous embodiment, at the outset of an inactive power stealing period (either on a one-time basis after thermostat installation or on ongoing basis as desired), the microcontroller 1108 initially sets the maximum current $I_{BP}$(max) to zero and measures the resultant voltage $V_{BR}$. This "open-circuit" value of $V_{BR}$ will typically be, for example, somewhere around 30 volts. The microcontroller 1108 then sets the maximum current $I_{BP}$(max) to 20 mA and measures the resultant voltage $V_{BR}$. If the value of $V_{BR}$ when $I_{BP}$(max)=20 mA remains roughly the same as its open-circuit value (less than a predetermined threshold difference, for example), then it is determined that the HVAC system is "strong enough" at the Y-lead to accommodate a higher value for the maximum current $I_{BP}$(max), and the microcontroller 1108 increases the maximum current $I_{BP}$(max) to 40 mA (corresponding to a maximum "safe" power stealing level of about 180 mW assuming 4.45 volts). On the other hand, if the value of $V_{BR}$ when $I_{Bp}$(max)=20 mA tends to sag relative to its open-circuit value (greater than the predetermined threshold difference, for example), then it is determined that the HVAC system is not "strong enough" at the Y-lead to accommodate an increased maximum current $I_{BP}$(max), and its value will remain fixed at 20 mA. Optionally, this process can be repeated to further increase the maximum current $I_{BP}$(max) to successively higher levels, although care should be taken to ensure by empirical testing with a target population of HVAC systems that the cooling call relay will not be tripped at such higher levels during inactive power stealing. For one embodiment, the process stops when $I_{BP}$(max)=40 mA, to avoid accidental cooling call relay tripping across a very large population of HVAC systems.

Operation of the powering circuitry 1110 for "active power stealing" is now described. In the description that follows it will be assumed that the "Y" wire has been inserted and therefore that power is to be stolen from the Y-lead, with it being understood that similar counterpart operation based on the "W" lead applies if no "Y" wire has been inserted. During an active cooling call, it is necessary for current to be flowing through the HVAC cooling call relay coil sufficient to maintain the HVAC cooling call relay in a "tripped" or ON state at all times during the active cooling call. In the absence of power stealing, this would of course be achieved by keeping the Y-Rc FET switch 1106 in ON state at all times to short the Y and Rc leads together. To achieve active power stealing, the microcontroller 1108 is configured by virtue of circuitry denoted "PS MOD" to turn the Y-Rc FET switch OFF for small periods of time during the active cooling call, wherein the periods of time are small enough such that the cooling call relay does not "un-trip" into an OFF state, but wherein the periods of time are long enough to allow inrush of current into the bridge rectifier 1120 to keep the bridge output capacitor 1122 to a reasonably acceptable operating level. For one embodiment, this is achieved in a closed-loop fashion in which the microcontroller 1108 monitors the voltage $V_{BR}$ at node 1123 and actuates the signal Y-CTL as necessary to keep the bridge output capacitor 1122 charged. By way of example, during active power stealing operation, the microcontroller 1108 will maintain the Y-Rc FET switch in an ON state while monitoring the voltage $V_{BR}$ until it drops below a certain lower threshold, such as 8 volts. At this point in time, the microcontroller 1108 will switch the Y-Rc FET switch into an OFF state and maintain that OFF state while monitoring the voltage $V_{BR}$, which will rise as an inrush of rectified current charges the bridge capacitor 1122. Then once the voltage $V_{BR}$ rises above a certain upper threshold, such as 10 volts, the microcontroller 1108 will turn the Y-Rc FET switch back into in an ON state, and the process continues throughout the active power stealing cycling. Although the scope of the present teachings is not so limited, the microcontroller 1108 is preferably programmed to keep the maximum current $I_{BP}$(max) to a relatively modest level, such as 20 mA (corresponding to a maximum "safe" power stealing level of about 90 mW assuming 4.45 volts) throughout the active power stealing cycle.

The circuit elements are designed and configured such that the ON-OFF cycling of the Y-Rc FET switch occurs at a rate that is much higher than 60 Hz and generally has no phase relationship with the HVAC power transformer, whereby the specter of problems that might otherwise occur due to zero crossings of the 24 VAC voltage signal are avoided. By way of example and not by way of limitation, for some embodiments the time interval required for charging the bridge output capacitor 1122 from the lower threshold of 8 volts to the upper threshold of 10 volts will be on the order 10 to 100 microseconds, while the time that it takes the bridge output capacitor 1122 to drain back down to the lower threshold of 8 volts will be on the order of 1 to 10 milliseconds. It has been found that, advantageously, at these kinds of rates and durations for the intermittent "OFF" state of the Y-Rc FET switch 1106, there are very few issues brought about by accidental "un-tripping" of the HVAC cooling call relay during active power stealing across a wide population of residential and commercial HVAC installations.

According to one embodiment, it has been found advantageous to introduce a delay period, such as 60-90 seconds, following the instantiation of an active cooling cycle before instantiating the active power stealing process. This delay period has been found useful in allowing many real-world HVAC systems to reach a kind of "quiescent" operating state in which they will be much less likely to accidentally un-trip away from the active cooling cycle due to active power stealing operation of the thermostat 1100. According to another embodiment, it has been found further advantageous to introduce another delay period, such as 60-90 seconds, following the termination of an active cooling cycle before instantiating the inactive power stealing process. This delay period has likewise been found useful in allowing the various HVAC systems to reach a quiescent state in which accidental tripping back into an active cooling cycle is avoided. Preferably, the microcontroller 1108 implements the above-described instantiation delays for both active and inactive power stealing by setting the maximum current $I_{BP}$(max) to zero for the required delay period. In some embodiments, the operation of the buck regulator circuit 1124 is also shut down for approximately the first 10 seconds of the delay period to help ensure that the amount of current being drawn by the powering circuitry 1110 is very small. Advantageously, the rechargeable-battery-assisted architecture of the powering circuitry 1110 readily accommodates the above-described instantiation delays in that all of the required thermostat electrical power load can be supplied by the rechargeable battery 1130 during each of the delay periods.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered as illustrative and not restrictive, and the inventive body of work is not to be limited to the details given herein, which may be modified within the scope and equivalents of the appended claims.

What is claimed is:

1. A thermostat configured for automated compatibility with HVAC systems that are either single-HVAC-transformer systems or dual-HVAC-transformer systems, the compatibility being automated in that a manual jumper installation is not required for adaptation to either single-HVAC-transformer systems or dual-HVAC-transformer systems, the thermostat comprising:
a housing;
one or more temperature sensors positioned within the housing for measuring ambient temperature;
a plurality of HVAC wire connectors configured for receiving a corresponding plurality of HVAC control wires, wherein the HVAC wire connectors include a first call relay wire connector, a first power return wire connector, a second call relay wire connector, and a second power return wire connector;
a thermostatic control circuit coupled to the one or more temperature sensors and configured to at least partially control the operation of the HVAC system responsive to a sensed temperature, the thermostatic control circuit including a first switching device that operatively connects the first call relay wire connector to the first power return wire connector to actuate a first HVAC function and including a second switching device that operatively connects the second call relay wire connector to the second power return wire connector to actuate a second HVAC function; first and second mechanically actuated switches coupled respectively to said first and second power return wire connectors, each said mechanically actuated switch being actuated by a physical wire insertion into the associated power return wire connector; and
an insertion sensing and connecting circuit coupled to said first and second power return wire connectors and configured such that:
(i) if first and second external wires have been inserted into the first and second power return wire connectors, respectively, then the first and second power return wire connectors are electrically isolated from each other by opening a pre-existing electrical connection between said first and second power return wire connectors by operation of the first and second mechanically actuated switches; and (ii) otherwise, the first and second power return wire connectors are electrically shorted together.

2. The thermostat of claim 1, wherein said insertion sensing and connecting circuit is configured to cause said electrical isolation of said first and second power return wire connectors upon a completion of an insertion of both of said first and second external wires without requiring a processing function from a digital processor.

3. The thermostat of claim 1, further comprising a common connector and a second sensing circuitry that detects the presence of a common wire in the common connector, and causes a connection of the common connector to a power extraction circuit if the common wire is inserted, wherein the thermostat extracts power from the common wire if the common wire is inserted.

4. The thermostat of claim 3, wherein the second sensing circuitry is configured to detect the presence of a call relay wire in a corresponding call relay wire connector, and cause a connection of that connector to the power extraction circuit if (a) the common wire is not inserted, and (b) that call relay wire is inserted.

5. The thermostat of claim 3, wherein the second sensing circuitry is configured to detect the presence of a first call relay wire in the first call relay connector, and cause a connection of the first call relay wire to the power extraction circuit if (a) the common wire is not inserted, and (b) the first call relay wire is inserted.

6. The thermostat of claim 3, wherein the second sensing circuitry is configured to detect the presence of a second call relay wire in the second call relay connector, and cause a connection of the second call relay wire to the power extraction circuit if (a) the common wire is not inserted, and (b) the first call relay wire is not inserted.

7. A method for automating compatibility of a thermostat with HVAC systems that are either single-HVAC-transformer systems or dual-HVAC-transformer systems, the compatibility being automated in that a manual jumper installation is not required for adaptation to either single-HVAC-transformer systems or dual-HVAC-transformer systems, the thermostat including a plurality of HVAC wire connectors configured for receiving a corresponding plurality of HVAC control wires, wherein the HVAC wire connectors include a first call relay wire connector, a first power return wire connector, a second call relay wire connector, and a second power return wire connector, the method comprising:
operatively connecting the first call relay wire connector to the first power return wire connector to actuate a first HVAC function;
operatively connecting the second call relay wire connector to the second power return wire connector to actuate a second HVAC function;
if first and second external wires have been inserted into the first and second power return wire connectors, respectively, then electrically isolating the first and second power return wire connectors by opening a pre-existing electrical connection between said first and second power return wire connectors by operation of first and second mechanically actuated switches coupled respectively to said first and second power return wire connectors, each said mechanically actuated switch being actuated by a physical wire insertion into the associated power return wire connector; and
otherwise, electrically shorting together the first and second power return wire connectors.

8. The method of claim 7, further comprising electrical isolating said first and second power return wire connectors upon a completion of an insertion of both of said first and second external wires without requiring a processing function from a digital processor.

9. The method of claim 7, wherein the thermostat further including a common connector, wherein the method further comprises detecting the presence of a common wire in the common connector, and causing a connection of the common connector to a power extraction circuit if the common wire is inserted, wherein the thermostat extracts power from the common wire if the common wire is inserted.

10. The method of claim 9, further comprising detecting the presence of a call relay wire in a corresponding call relay wire connector, and causing a connection of that connector to the power extraction circuit if (a) the common wire is not inserted, and (b) that call relay wire is inserted.

11. The method of claim 9, further comprising detecting the presence of a first call relay wire in the first call relay connector, and causing a connection of the first call relay wire to the power extraction circuit if (a) the common wire is not inserted, and (b) the first call relay wire is inserted.

12. The method of claim 9, further comprising detecting the presence of a second call relay wire in the second call relay connector, and causing a connection of the second call relay wire to the power extraction circuit if (a) the common wire is not inserted, and (b) the first call relay wire is not inserted.

13. A thermostat configured for automated compatibility with HVAC systems that are either single-HVAC-transformer systems or dual-HVAC-transformer systems, the compatibility being automated in that the thermostat is adapted to either single-HVAC-transformer systems or dual-HVAC-transformer systems without requiring a manual jumper installation and without requiring a processing function from a digital processor by opening a pre-existing electrical connection between first and second power return wire connectors by operation of first and second mechanically actuated switches coupled respectively to said first and second power return wire connectors, each said mechanically actuated switch being actuated by a physical wire insertion into the associated power return wire connector.

14. The thermostat of claim 13, wherein the thermostat comprising:
   a housing;
   one or more temperature sensors positioned within the housing for measuring ambient temperature;
   a plurality of HVAC wire connectors configured for receiving a corresponding plurality of HVAC control wires, wherein the HVAC wire connectors include a first call relay wire connector, a first power return wire connector, a second call relay wire connector, and a second power return wire connector
   a thermostatic control circuit coupled to the one or more temperature sensors and configured to at least partially control the operation of the HVAC system responsive to a sensed temperature, the thermostatic control circuit including a first switching device that operatively connects the first call relay wire connector to the first power return wire connector to actuate a first HVAC function and including a second switching device that operatively connects the second call relay wire connector to the second power return wire connector to actuate a second HVAC function; and
   an insertion sensing and connecting circuit coupled to said first and second power return wire connectors and configured such that: (i) if first and second external wires have been inserted into the first and second power return wire connectors, respectively, then the first and second power return wire connectors are electrically isolated from each other; and (ii) otherwise, the first and second power return wire connectors are electrically shorted together.

15. The thermostat of claim 14, wherein said insertion sensing and connecting circuit is configured to open a pre-existing electrical connection between said first and second power return wire connectors by operation of first and second mechanically actuated switches coupled respectively to said first and second power return wire connectors, each said mechanically actuated switch being actuated by a physical wire insertion into the associated power return wire connector.

16. The thermostat of claim 13, further comprising a common connector and a second sensing circuitry that detects the presence of a common wire in the common connector, and causes a connection of the common connector to a power extraction circuit if the common wire is inserted, wherein the thermostat extracts power from the common wire if the common wire is inserted.

17. The thermostat of claim 16, the second sensing circuitry is configured to detect the presence of a first call relay wire in the first call relay connector, and cause a connection of the first call relay wire to the power extraction circuit if (a) the common wire is not inserted, and (b) the first call relay wire is inserted.

18. The thermostat of claim 16, wherein the second sensing circuitry is configured to detect the presence of a second call relay wire in the second call relay connector, and cause a connection of the second call relay wire to the power extraction circuit if (a) the common wire is not inserted, and (b) the first call relay wire is not inserted.

* * * * *